United States Patent [19]
Arai et al.

[11] Patent Number: 5,755,844
[45] Date of Patent: May 26, 1998

[54] RESIN-MADE AIR CLEANER

[75] Inventors: Yasunari Arai; Yoshiyuki Murao, both of Kariya; Yasuhiro Okazaki, Okazaki; Yukihisa Horikou, Nagoya; Tsuyoshi Minari, Kariya; Kouji Kume, Chita-gun, all of Japan

[73] Assignees: Toyoda Boshoku Corporation; Nippondenso Co., Ltd., both of Kariya, Japan

[21] Appl. No.: 531,648

[22] Filed: Sep. 21, 1995

[30] Foreign Application Priority Data

Sep. 22, 1994 [JP] Japan ..................... 6-228342
Nov. 17, 1994 [JP] Japan ..................... 6-283343

[51] Int. Cl.⁶ ........................................ B01D 46/00
[52] U.S. Cl. ........................... 55/502; 55/498; 55/511
[58] Field of Search ........................... 55/502, 498, 511, 55/514, 521, 524

[56] References Cited

U.S. PATENT DOCUMENTS

| | | |
|---|---|---|
| 4,720,292 | 1/1988 | Eagel et al. . |
| 4,758,256 | 7/1988 | Machado . |
| 5,071,456 | 12/1991 | Binder et al. ............... 55/502 |
| 5,160,519 | 11/1992 | Svensson et al. .......... 55/502 |
| 5,167,683 | 12/1992 | Behrendt et al. . |
| 5,399,264 | 3/1995 | Pulek et al. .................. 55/502 |
| 5,423,892 | 6/1995 | Kahlbaugh et al. ......... 55/498 |

FOREIGN PATENT DOCUMENTS

| | | |
|---|---|---|
| 0 063 202 | 10/1982 | European Pat. Off. . |
| 0 470 330 | 2/1992 | European Pat. Off. . |
| 0 423 435 | 2/1994 | European Pat. Off. . |
| 1-176738 | 12/1989 | Japan . |
| 2-129235 | 10/1990 | Japan . |
| 6-43256 | 6/1994 | Japan . |

*Primary Examiner*—Jay H. Woo
*Assistant Examiner*—Iurie A. Schwartz
*Attorney, Agent, or Firm*—Oblon, Spivak, McClelland, Maier & Neustadt, P.C.

[57] ABSTRACT

A resin-made air cleaner includes a hollow resin-made housing, a tubular element accommodated in the housing, a tubular projection, a gasket fitted around the tubular projection, and disposed between the tubular element and the tubular projection, a stopper for inhibiting the gasket from moving. The tubular projection is disposed on at least one of opposite end surfaces of the housing so as to project toward the inside of the housing. The stopper is disposed on the projection and/or the opposite end surfaces of the housing, on which the projection is disposed. This arrangement not only enables the increase of the resin content of the air cleaner, but also inhibits the gasket from coming off from the projection when the element is disassembled.

17 Claims, 14 Drawing Sheets

(PRIOR ART)

RESIN-MADE AIR CLEANER

BACKGROUND OF THE INVENTION

1. Field of the Invention

The present invention relates to a resin-made air cleaner which purifies air, to be supplied to engines, by filtering.

2. Description of Prior Art

A conventional air cleaner has been known which is constructed so as to hold a tubular element in an accommodating chamber of a resin-made housing by means of a center bolt.

As illustrated in FIG. 15, in one of the conventional air cleaners, a tubular element 4a is accommodated in an accommodating chamber, which is formed by a resin-made housing 1a and a resin-made cap 2a. The element 4a is held integrally to the cap 2a via a gasket (e.g., an O-ring) 3a, which effects a sealing action. A center bolt 5a having opposite ends 50a, 50b works as one of fastening members for fastening the element 4a, and is disposed along the axial center line "P" of the housing 1a. The one end 50a of the center bolt 5a is fastened to the cap 2a. The other end 50b of the center bolt 5a is threaded, and inserted into a bolt hole 40c, which is formed on one of the opposite ends of the element 4a (e.g., an engagement end 40b). Moreover, the threaded end 50b of the center bolt 5a is screwed with a wing nut 6a. Thus, the element 4a is fastened to the cap 2a via the gasket 3a.

Further, though not shown by a drawing, there is the following inverted fastening construction; namely: the center bolt 5a is fastened to the housing 1a, instead of the cap 2a, thereby integrally holding the element 4a in the housing 1a via the gasket 3a.

In the conventional air cleaner holding the element 4a by means of the center bolt 5a, the center bolt 5a and the wing nut 6a produce a large fastening force, thereby integrally holding the element 4a together with the gasket 3a in the housing 1a or the cap 2a.

The resin-made housing 1a and the resin-made cap 2a are made of materials which are likely to be subjected to chronic change. In addition, they are always subjected to a large fastening force. Accordingly, they are likely to show large variation rate, and to suffer from permanent set.

When the resin-made housing 1a and the resin-made cap 2a are deformed by chronic change and permanent set, the center bolt 5a and the wing nut 6a may produce a reduced fastening force, and there may be produced spaces between the gasket 3a and the element 4a. Consequently, the sealing action of the gasket 3a may be impaired, and dust may be leaked to the outside.

In order to avoid the drawback resulting from the center-bolt-fastening construction, Japanese Unexamined Utility Model Publication (KOKAI) No. 1-176,738, Japanese Unexamined Utility Model Publication (KOKAI) No. 2-129,235, and Japanese Unexamined Utility Model Publication (KOKAI) No. 6-43,256 disclose so-called internal-tube-sealing constructions.

Japanese Unexamined Utility Model Publication (KOKAI) No. 1-176,738 and Japanese Unexamined Utility Model Publication (KOKAI) No. 2-129,235 disclose one of the internal-tube-sealing constructions. For example, a resin-made housing, a resin-made upper cap, or a resin-made lower cap is provided with a tubular projection. The projection is adapted for mounting a tubular element on its outer peripheral surface. The element has an inner peripheral surface at its opposite ends in the axial direction, and is provided with an annular-shaped gasket on both of the inner peripheral surfaces or one of them. The gasket is formed as a rectangular shape or an inverted-letter "L" shape in cross-section, and is disposed between the outer peripheral surface of the projection and the inner peripheral surface of the element, thereby effecting a sealing action by forming a sealing surface, which is parallel with the contact.

Japanese Unexamined Utility Model Publication (KOKAI) No. 6-43,256 discloses another one of the internal-tube-sealing constructions. As illustrated in its FIG. 2 particularly, an element is provided with an engagement groove on its upper surface. An annular-shaped gasket having inverted-letter "L" shape in cross-section is disposed in the engagement groove. A tubular housing is constructed so as to be dividable into an upper housing and a lower housing. The upper housing is provided with a tubular projection which projects toward the lower housing. The element is disposed around the outer periphery of the projection of the upper housing, and accordingly the gasket is disposed between the top surface of the element and the inner top surface of the upper housing. In addition, there is provided an enclosed space between the gasket and the inner top surface of the upper housing.

In accordance with the internal-tube-sealing constructions, it is possible to obviate the fastening members, e.g., the center bolt and the wing nut. Accordingly, it is possible to reduce the weight and cost of the air cleaners.

In the air cleaner disclosed in Japanese Unexamined Utility Model Publication (KOKAI) No. 1-176,738, the upper cap is provided with the element-mounting tubular projection, and is riveted to an upper portion of the housing. The lower cap is fixed to a lower portion of the housing by bolts. In the air cleaner disclosed in Japanese Unexamined Utility Model Publication (KOKAI) No. 2-129,235, the element-mounting tubular projection, disposed on the resin-made housing, is made of metal in order to provide stabilized sealing between itself and the annular-shaped gasket having an inverted letter "L" shape in cross-section. Thus, there is room for weight and cost reductions in both of the air cleaners.

Hence, one may think of making the element-mounting tubular projection out of resin (e.g. polypropylene, or the like), and forming it integrally with the resin-made housing. However, when the annular-shaped gasket is disposed around a polypropylene-made element-mounting tubular projection, the gasket is likely to slide thereon. Thus, a sticky-fastening force is exerted to the gasket weakly. Consequently, the gasket is likely to come off from the polypropylene-made element-mounting tubular projection.

The annular-shaped gasket has a vertically-long rectangular cross-section, or an inverted letter "L" shaped cross-section. Accordingly, it contacts with the element-mounting projection parallelly with the axial center line of the element-mounting projection. However, the gasket is compressed in its thickness-wise direction to generate a resilient reactive force which results in producing the sealing action. Therefore, when the gasket is once deformed by heat, etc., the deformed gasket cannot generate the resilient reactive force, and cannot contact with the element-mounting projection so as to conform to the sealing surface thereof.

The air cleaner disclosed in Japanese Unexamined Utility Model Publication (KOKAI) No. 6-43,256 suffers from the following drawbacks; namely: when replacing the element, the gasket should be removed and re-installed together with the element because the gasket is fixed on the top surface of the element. Thus, such a construction is disadvantageous from the viewpoint of replacement cost. Further, the element cannot be removed by a small working force, and cannot be replaced quickly because the end surfaces of the element and the outer peripheral surfaces of the element-mounting tubular projection contacts with each other over a large contact area. Furthermore, the gasket is pressed against the inner top surface of the tubular housing because there is formed an enclosed space between the gasket and the inner top surface of the tubular housing, and because the enclosed space operates like a suction cap. Thus, such a construction exhibits reduced durability against chronic change, and cannot absorb a large dimensional tolerance, which may exist between the inner top surface of the tubular housing and the top surface of the element. As a result, the element is likely to rattle about the element-mounting tubular projection when it is mounted therearound, or it may be mounted faultily therearound.

SUMMARY OF THE INVENTION

The present invention has been developed in view of the aforementioned circumstances. It is therefore an object of the present invention to provide a resin-made air cleaner which can solve the above-described drawbacks in the replacement of a tubular element, which is provided with a gasket configured to be capable of keeping its sealing action even if the gasket itself degrades or component parts therearound degrade, and whose gasket is less likely to come off from its mounting position in the replacement of a tubular element.

In a first embodiment of the present invention, a resin-made air cleaner, comprises:

- a hollow resin-made housing having an air-inlet port, an air-outlet port, a tubular wall surface, and opposite end surfaces;
- a tubular element having annular-shaped opposite end surfaces, the annular-shaped opposite end surfaces facing the opposite end surfaces of the housing, and accommodated in the housing;
- a tubular projection disposed on at least one of the opposite end surfaces, facing the annular-shaped opposite end surfaces of the tubular element, of the housing, and projecting toward the inside of the housing;
- a gasket fitted around the tubular projection, and disposed between the tubular element and the tubular projection; and
- a stopper for inhibiting the gasket from moving, the stopper disposed on at least one of the tubular projection and the opposite end surfaces of the housing, on which the tubular projection is disposed.

The thus constructed first embodiment of the present resin-made air cleaner operates and effects advantages as hereinafter described; namely: the tubular projection, which is disposed on at least one of the opposite end surfaces of the housing, is fitted into the gasket. The gasket is deformed resiliently, and is enlarged so as to conform to an outer configuration of the projection and to move to a predetermined mounting position. Thus, the gasket is mounted onto the projection by a resilient reactive force, which results from the resilient deformation, so as to be in close contact with the outer peripheral surface of the projection. In addition, the gasket is engaged with the stopper, which is disposed on the projection and/or on the opposite end surfaces of the housing, and is inhibited from coming off from the mounting position. As a result, the gasket can be kept on being mounted onto the projection.

In a second embodiment of the present resin-made air cleaner, the gasket of the first embodiment can include a tubular body having an outer peripheral surface, an inner peripheral surface and opposite end surfaces, and at least the outer peripheral surface of the tubular body can be provided with a ring-shaped lip which extends slantly with respect to an axial direction of the tubular body.

In the thus constructed second embodiment of the present resin-made air cleaner, when the element is fitted around the tubular projection, the gasket is compressed resiliently, and is disposed between the projection and the element. At this moment, the lip is brought into contact with an inner peripheral surface of the element, and is pressed against it. Thus, the outer periphery of the lip is flexed toward the inner periphery thereof. As a result, the element is pressed on the inner peripheral surface by a reactive force, which results from the resilient deformation of the gasket, and by a reactive force, which results from the configurational change of the lip, and thereby it is sealed securely. Thus, the lip works as means for bringing the gasket into close contact with the element and producing the enhanced sealing action.

In a third embodiment of the present resin-made air cleaner, the ring-shaped lip of the second embodiment, provided on the tubular body of the gasket, can have a leading free end which extends to a dusty side where unpurified air is present.

When purifying air by the thus constructed third embodiment, the lip is subjected to a negative pressure (i.e., a differential pressure between an atmospheric pressure on a dusty side and an atmospheric pressure on a clean side). The dusty side is an upstream chamber of the element into which unpurified air is flowed, and the clean side is a downstream chamber of the element out of which purified air is flowed. Thus, in addition to the reactive force, which results from the configurational change of the lip in the element-assembly operation, the negative pressure can be utilized to further upgrade the enhanced sealing action of the lip by the thus constructed leading free end of the lip.

As a result, even when the sealing surface of the element and the tubular projection has slight irregularities, or when the sealing surface is deformed, the gasket of the third embodiment can produce the sealing action sufficiently. Specifically, when the element is replaced, or when it is cleaned and re-assembled, the gasket can contact closely so as to conform to the configuration of the sealing surface, and can reliably inhibit dusts from leaking to the outside.

In the first through third embodiments of the present resin-made air cleaner, it is possible to disassemble the element only, while keeping the gasket being mounted onto the tubular projection, which is disposed on the resin-made housing. This feature of the present resin-made air cleaner is advantageous after the present resin-made air cleaner is used for a specified period of time; namely: when the element is replaced to a new one, or when it is cleaned to reproduce its function.

When the tubular projection, which is disposed on the resin-made housing, is formed of polypropylene, the gasket, which is mounted onto the projection, is likely to slide in the direction of the axial center line of the projection. When the gasket is degraded to exhibit reduced resilience, the gasket is likely to exert a decreased resilient reactive force, which results in a decreased fastening force to be applied to the outer peripheral wall of the projection. Under these circumstances, the gasket is likely to be subjected to a frictional force, which results from the contact with the element in the disassembling operation of the element. However, in the first through third embodiments of the present resin-made air cleaner, the gasket is inhibited from coming off from the projection because it is engaged with the stopper, which is disposed on the projection and/or the opposite end surfaces of the resin-made housing. Thus, the gasket can be held at its regular mounting position.

In a fourth embodiment of the present resin-made air cleaner, the opposite end surface, with the tubular projection provided, of the resin-made housing can be further provided with a second stopper which extends coaxially with the tubular projection to the inside of the housing, and whose inside diameter is larger than an outside diameter of the tubular projection.

In the fourth embodiment, the second stopper not only inhibits the gasket from coming off from the tubular projection in a direction which is opposite to the element-assembling direction, but also prohibits the gasket from tearing off from the projection diametrically outward.

In a fifth embodiment of the present resin-made air cleaner, an annular-shaped flange, which projects outward in a diametric direction of the tubular body, can be further disposed on at least one of the opposite end surfaces of the tubular body of the gasket.

In the fifth embodiment, by means of the annular-shaped flange, the gasket resiliently damps the vertical movements of the element. In addition, it resiliently absorbs fluctuations of the clearance between the opposite end surfaces of the resin-made housing and the opposite ends of the element when the dimensional tolerances of the housing and the element vary. Thus, a satisfactory sealing action can be produced between the housing and the element.

In a sixth embodiment of the present resin-made air cleaner, the annular-shaped flange of the fifth embodiment can be further provided with urging means for urging the tubular element in an axial direction of the tubular body of the gasket.

In the sixth embodiment, when mounting the element onto the tubular projection, which is disposed on one of the opposite end surfaces of the resin-made housing, the urging means exerts an urging force to the element in a direction which is opposite to the fitting of the tubular projection into the element.

Therefore, in addition to the advantages produced by the fifth embodiment, the sixth embodiment produces the following extra advantage; namely: the urging means applies its urging force to the element in the disassembling direction when replacing the element. Hence, the element-disassembling operation can be carried out easily.

In accordance with the present invention, it is possible to increase the resin content of air cleaners. Thus, in the first through sixth embodiments of the present resin-made air cleaner, their weights are reduced more successfully than the conventional air cleaners which comprise metallic component parts.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure.

DETAILED DESCRIPTION OF THE PREFERRED EMBODIMENTS

Having generally described the present invention, a further understanding can be obtained by reference to the specific preferred embodiments which are provided herein for purposes of illustration only and are not intended to limit the scope of the appended claims.

First Preferred Embodiment

Figure 1:
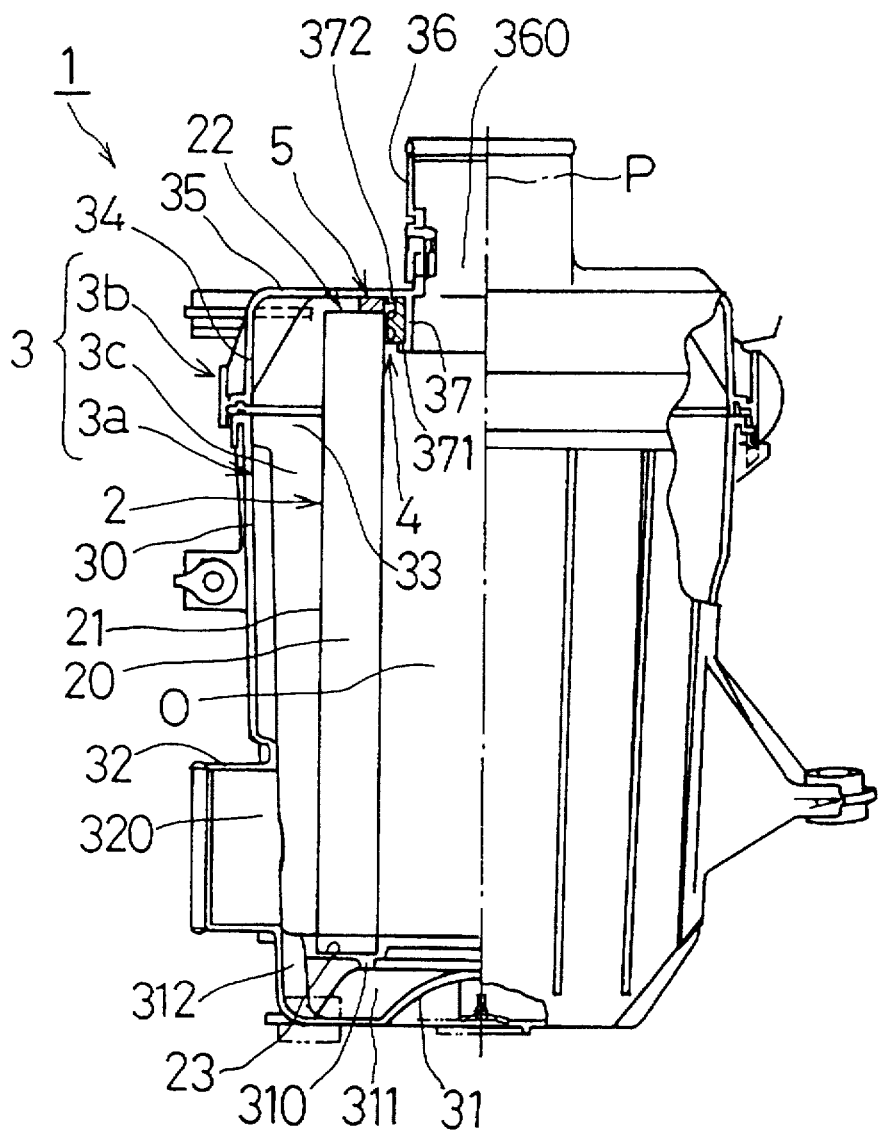
FIG. 1 is a cross-sectional view- illustrating a First Preferred Embodiment of a resin-made air cleaner according to the present invention.

A First Preferred Embodiment of a resin-made air cleaner according to the present invention will be hereinafter described with reference to FIGS. 1 and 2. As illustrated in FIG. 1, a resin-made air cleaner 1, i.e., the First Preferred Embodiment, comprises a tubular element 2, a tubular resin-made housing 3, a tubular gasket 4, and an annular-shaped second gasket 5.

The tubular element 2 includes a tubular filter 20, a tubular outer-peripheral reinforcement 21, a first reinforcement end plate 22, and a second reinforcement end plate 23. The tubular filter 20 has a central bore "O", and fins (not shown) which are disposed around the central bore "O" and are formed as a honeycomb shape in cross-section altogether. The tubular outer-peripheral reinforcement 21 is disposed around the filter 20, and has a plurality of pores (not shown). The first and second reinforcement end plates 22, 23 are disposed on opposite annular-shaped ends of the filter 20 with respect to the direction of the axial center line "P".

Figure 2:
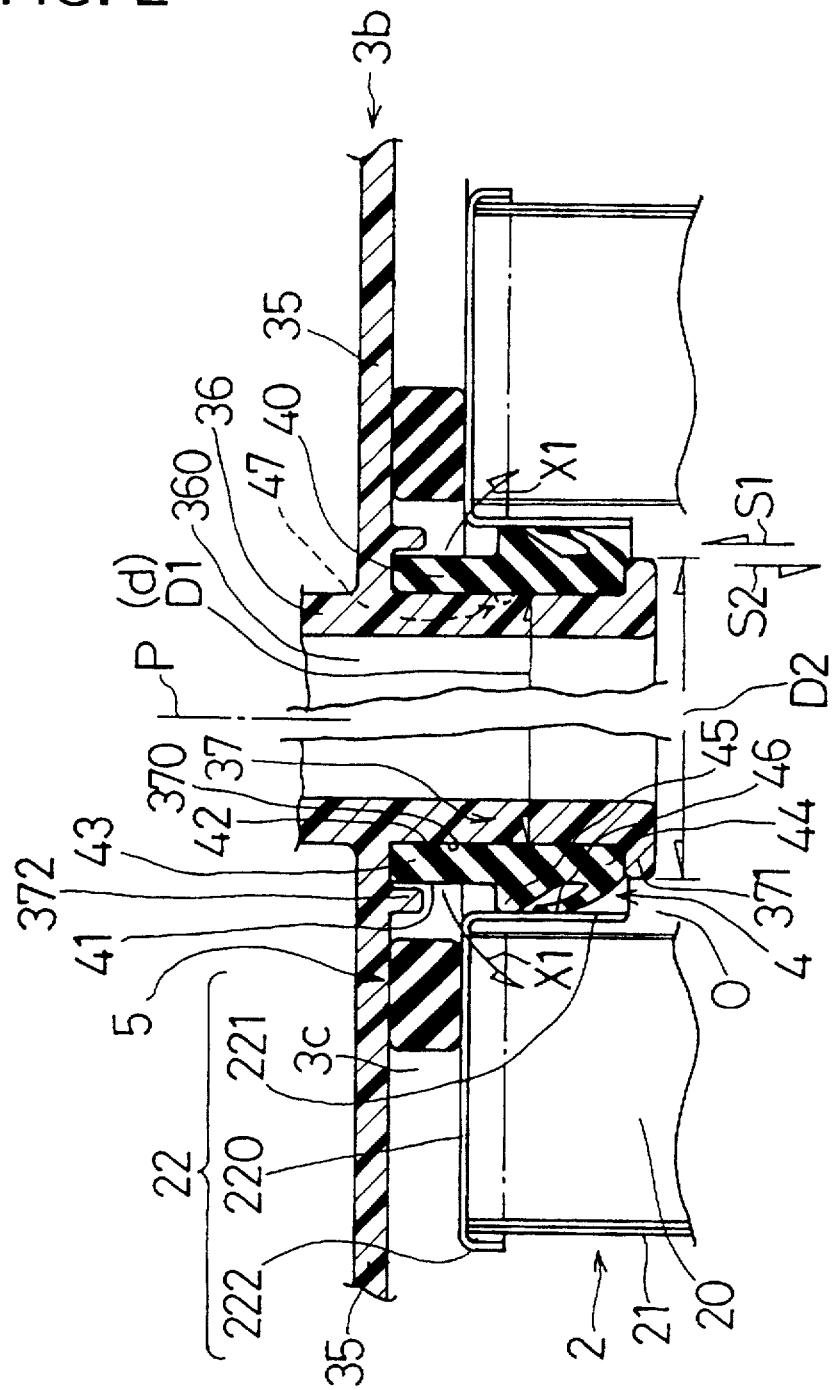
FIG. 2 is a partially enlarged cross-sectional view in which major portions of FIG. 1 are enlarged.

As illustrated in FIG. 2 which is enlarged to show major portions of the resin-made air cleaner 1, the annular-shaped first reinforcement end plate 22 has a flat end surface 220, a tubular inner peripheral surface 221, and a tubular outer peripheral surface 222. The flat end surface 220 is mounted onto one of the opposite ends of the filter 20. The tubular inner peripheral surface 221 is projected downward from the inner peripheral end of the flat end surface 220. The tubular outer peripheral surface 222 is projected downward from the outer peripheral end of the flat end surface 220.

The tubular element 2 is accommodated within an accommodating chamber 3c in a housing body 3a of the resin-made housing 3, which is shown in FIG. 1 and described later. The accommodating chamber 3c is disposed between an air-inlet passage 32 of the housing body 3a and an air-outlet passage 36 of a cover 3b. Thus, unpurified air is drawn in through the air-inlet passage 32, and is passed through the element 2 from its outer periphery to its inner periphery. Then, purified air is drawn out through the air-outlet passage 36 via the central bore "O".

As illustrated in FIG. 1, the resin-made housing 3 includes the housing body 3a, and the cover 3b.

The housing body 3a forms the accommodating chamber 3c, in which the tubular element 2 is accommodated, and is formed of resin integrally as a tube having a bottomed end. For example, the housing body 3a can be formed of polyethylene (PE), polypropylene (PP), polystyrene (PS), acrylonitrile-styrene copolymer (AS), acrylonitrile-butadiene-styrene copolymer (ABS), polymethyl methacrylate (PMMA), polybutylene terephthalate (PBT), polyethylene terephthalate (PET), polyamide (PA), polyacetal (POM), polycarbonate (PC), or polytetrafluoroethylene (PTFE).

The housing body 3a has a peripheral wall 30, a bottom 31, and an opening 33. The bottom 31 and the opening 33 are disposed on opposite ends of the peripheral wall 30 with respect to the direction of the axial center line "P". The peripheral wall 30 is integrally provided with an air-inlet port 320, and the air-inlet passage 32. The air-inlet port 320 is disposed adjacent to the bottom 31 in the peripheral wall 30, and is opened perpendicularly with the direction of the axial center line "P". The air-inlet passage 32 communicates with the air-inlet port 320.

Moreover, the bottom 31 of the housing body 3a is provided with a table 311 and a fixing lib 312 on its inner periphery. The table 311 is adapted for placing the tubular element 2 thereon. Specifically, the element 2 is placed on the table 311 via a buffer 310. The buffer 310 is formed integrally with one of the opposite annular-shaped end surfaces of the elements 2 where the second reinforcement end plate 23 is disposed. The fixing lib 312 is adapted for fixing the element 2 in radial directions.

The cover 3b is formed of resin integrally. For instance, the cover 3b can be formed of polyethylene (PE), polypropylene (PP), polystyrene (PS), acrylonitrile-styrene copolymer (AS), acrylonitrile-butadiene-styrene copolymer (ABS), polymethyl methacrylate (PMMA), polybutylene terephthalate (PBT), polyethylene terephthalate (PET), polyamide (PA), polyacetal (POM), polycarbonate (PC), or polytetrafluoroethylene (PTFE). As illustrated in FIG. 1, the cover 3b has a peripheral wall 34, a top 35, the air-outlet passage 36, and a tubular projection 37. The peripheral wall 34 is fastened to the opening 33, which is formed at one of the opposite ends of the peripheral wall 30 of the housing body 3a. The top 35 is disposed so as to face the bottom 31 of the housing body 3a. The air-outlet passage 36 communicates with an air-outlet port 360, which is opened in the center of the top 35. The tubular projection 37 is projected from the top 35 to the inside of the accommodating chamber 3c.

The tubular projection 37 is adapted for holding the tubular gasket 4 which will be described later, and is provided with an annular-shaped stopper 371 at its leading end, which projects into the accommodating chamber 3c. As illustrated in FIG. 2, the gasket 4 is fitted over an outer peripheral surface 370 of the projection 37 in the direction of arrow "S1" of the drawing. The stopper 371 is adapted for inhibiting the gasket 4 from coming off from the projection 37 in the direction of arrow "S2" of the drawing.

In particular, the stopper 371 of the tubular projection 37 is designed to have an outside diameter "D2", which is larger than an outside diameter "D1" of the projection 37. For example, when the outside diameter "D1" of the projection 37 is 74 mm, the outside diameter "D2" of the stopper 371 is designed to be 80 mm. Note that the outside diameters "D1" and "D2" are not limited to these values, and can be varied as desired.

The top 35 of the cover 3b is further provided with an annular-shaped second stopper 372 on its inner end surface where it faces the stopper 371 of the tubular projection 37. The second stopper 372 is disposed thereon coaxially with the tubular projection 37, and is away therefrom by a distance of about 4 mm.

As illustrated in FIG. 2, the tubular gasket 4 includes a tubular body 40 having an outer peripheral surface 41, an inner peripheral surface 42, opposite ends 43, 44, a thick ring-shaped guide 45, an ring-shaped lip 46, and a ring-shaped inner convexity 47. For example, the gasket 4 is formed integrally of natural rubber (NR), isoprene rubber (IR), styrene-butadiene rubber (SBR), butadiene rubber (BR), chloroprene rubber (CR), isobutylene-isoprene rubber (IIR), nitrile rubber (NBR), ethylene propylene rubber (EPDM), chlorosulphonated polyethylene rubber (CSM), epichlorohydrin rubber (CO or ECO), acrylic rubber (ACM or ANM), urethane rubber (U), silicone rubber (Q), or fluoroelastomer (F).

The guide 45 is adapted for guiding the tubular element 2 in the assembling operation thereof. Further, the guide 45 is disposed on the outer peripheral surface 41 of the body 40 virtually at the center between the opposite ends 43, 44 thereof, and is formed as a substantially triangular shape in cross-section. The lip 46 is disposed on the outer peripheral surface 41. Further, the lip 46 is extended from the end 45 of the body 40 slantly in the direction of the assembling direction of the element 2 (e.g., in the direction of arrow "S1" of the drawing), and is formed to have a cross-section whose area diminishes from its fixed end to its free end. The inner convexity 47 is disposed on the inner peripheral surface 42 of the body 40 virtually at the center between the opposite ends 43, 44 thereof, and is formed as a semi-circular shape in cross-section.

For instance, the tubular body 40 is designed to have a thickness of 3.4 mm, and an inside diameter "d" of 72.2 mm. The guide 45 is designed to have a protrusion height of about 3 mm from the outer peripheral surface 41. The lip 46 is designed to have a slanting angle, prior to the assembly operation of the tubular element 2, of from 60 to 90 deg. with respect to the outer peripheral surface 41, and its slanting portion is designed to have a length of about 6 mm.

The annular-shaped second gasket 5 is adapted for producing a sealing effect, and is disposed between the element 2 (specifically, the annular-shaped flat end surface 220 of the first reinforcement end plate 22) and the top 35 of the cover 3b. Further, it is formed as a horizontally-long rectangular shape in cross-section, and is designed to have a thickness of 10 mm. For instance, the second gasket 5 is formed integrally of natural rubber (NR), isoprene rubber (IR), styrene-butadiene rubber (SBR), butadiene rubber (BR), chloroprene rubber (CR), isobutylene-isoprene rubber (IIR), nitrile rubber (NBR), ethylene propylene rubber (EPDM), chlorosulphonated polyethylene rubber (CSM), epichlorohydrin rubber (CO or ECO), acrylic rubber (ACM or ANM), urethane rubber (U), silicone rubber (Q), or fluoroelastomer (F).

The thus constructed resin-made air cleaner 1 is assembled in the following order. First, as illustrated in FIG. 2, the tubular gasket 4 is fitted around the tubular projection 37 of the cover 3b. During the fitting operation, the tubular body 40 of the gasket 4 is first placed on the side of the stopper 371 of the projection 37, and is fitted around the projection 37 in the direction of arrow "S1" against its own resilient force. The body 40 enlarges its inside diameter to go over the stopper 371, and is disposed on the outer peripheral surface of the projection 37. Thus, due to the resilient force of the body 40, the inner peripheral surface 42 of the body 40 is brought into close contact with the outer peripheral surface 370 of the projection 37 whose outside diameter "D1" is slightly larger than the inside diameter "d" of the body 40.

In particular, the inner peripheral surface 42 is brought into contact with the outer peripheral surface 370 by an enlarged pressure because of the ring-shaped convexity 47 (shown by broken line of FIG. 2) of the tubular body 40. Accordingly, there is produced effective sealing between the gasket 4 and the projection 37.

Note that the gasket 4, which is fitted around the tubular projection 37 of the cover 3b, is engaged with the stopper 371 whose outside diameter "D2" is larger than the inside diameter "d" of the gasket 4. Consequently, the end 44 of the gasket 4 is reliably inhibited from moving in the coming-off direction (e.g., the direction of arrow "S2" of FIG. 2), which is opposite to the fitting direction (e.g., the direction of arrow "S1" of the drawing).

After the gasket 4 is fitted around the tubular projection 37 of the cover 3b, the element 2 is then fitted around the projection 37 while interposing the gasket 4 therebetween. The element 2 is brought into contact with the lip 46 of the gasket 4 on the tubular inner peripheral surface 221 of its first reinforcement end plate 22, and is fitted around the gasket 4 in the direction of arrow "S1" of FIG. 2. Note that, during the fitting operation, the annular-shaped second gasket 5 is kept on being placed on the annular-shaped flat end surface 220 of the first reinforcement end plate 22.

Specifically, the tubular inner peripheral surface 221 of the element 2 contacts with the lip 46 of the gasket 4, and moves thereon while varying the slanting direction of the lip 46. At the same time, the inner peripheral surface 221 also contacts with the top of the guide 45 of the gasket 4, and continues to move. Finally, the element 2 arrives at its regular mounting position illustrated in FIG. 2.

During the fitting operation of the element 2, the guide 45 of the gasket 4 is compressed resiliently by the tubular projection 37 and the tubular inner peripheral surface 221 of the first reinforcement end plate 22 of the element 2. The lip 46 of the gasket 4 is also brought into contact with the tubular inner peripheral surface 221 of the first reinforcement end plate 22 of the element 2. Accordingly, the outer periphery of the lip 46 is pressed to flex toward the inner periphery thereof.

Thus, when the element 2 is mounted over the tubular projection 37 via the gasket 4, it is sealed securely because its tubular inner peripheral surface 221 is pressed by the following reactive forces; namely: the reactive force which results from the resilient compression in the guide 45 of the gasket 4, and the reactive force which results from the configurational change in the lip 46 of the gasket 4. Moreover, the element 2 is sealed further securely because its top end surface (i.e., the flat end surface 220 of its first reinforcement end plate 22) is further pressed by the reactive force which results from the resilient compression in the second gasket 5, which is disposed between the top 35 of the cover 3 and the flat end surface 220.

Finally, as illustrated in FIG. 1, the cover 3b and the housing body 3a are assembled together. Specifically, as can be appreciated from FIG. 1, the peripheral wall 34 of the cover 3b is connected with the opening 33, which is formed at one of the opposite ends of the peripheral wall 30 of the housing body 3a. When thus assembled, the second reinforcement end plate 23 of the element 2 is placed on the table 311, which is disposed on the bottom 31 of the housing body 3a, via the buffer 310, and is engaged with the fixing lib 312. Thus, the second reinforcement end plate 23 of the element 2 is held reliably at its regular fixing position.

In the thus assembled resin-made air cleaner 1, the gasket 4 is inhibited from moving in the direction of arrow "S2" of FIG. 2. Especially, even when the element 2, mounted over the tubular projection 37 via the gasket 4, is disassembled in the direction (e.g., the direction of arrow "S2" of the drawing) opposite to the assembling direction (e.g., the direction of arrow "S1" of the drawing) for replacement or cleaning, the gasket 4 is hardly moved in the direction of arrow "S2". For instance, when the element 2 is pulled out in the direction of arrow "S2", the gasket 4 is subjected to a frictional force in the coming-off direction (e.g., the direction of arrow "S2"). If such is the case, the gasket 4 is inhibited from moving in the direction of arrow "S2" because its tubular body 40 is engaged with the stopper 371 of the projection 37 at the end 44.

When disassembling the element 2, the tubular body 40 of the gasket 4 tries to enlarge its diameter at the end 43 in the direction of arrow "X1" of FIG. 2 around the end 44 which is engaged with the stopper 371. However, this diametric enlargement is prohibited because the body 40 is engaged with the second stopper 372 at the end 43. Thus, the gasket 4 is inhibited from coming off from the tubular projection 37 of the cover 3b during the disassembling operation of the element 2.

The gasket 4 is thus engaged with the stopper 371 and the second stopper 372 at the opposite ends 44, 43. Accordingly, the above-described advantages are effected operatively even under the following circumstances; namely:

when the tubular projection 37 is formed of, for example, polypropylene on which objects are likely to slide and the gasket 4 is mounted onto the polypropylene-made projection 37, the gasket 4 is likely to slide on the projection 37 in the direction of the axial center line "P" in the disassembling operation of the element 2; and when the gasket 4 is used for a long period of time and its tubular body 40 exhibits degraded resiliency, it exerts a decreased fastening force to the outer peripheral surface 370 of the projection 37.

In the resin-made air cleaner 1, the gasket 4 operates and effects the following extra advantages when the element 4 purifies unpurified air.

For instance, when the resin-made air cleaner 1 is in service, unpurified air is drawn in through the air-inlet passage 32, which is formed in the housing body 3a of the resin-made housing 3, and is passed through the filter 20 of the element 2 from its outer periphery to its inner periphery, thereby filtering and purifying the unpurified air. Then, purified air is drawn out to the air-outlet passage 36, which is formed in the cover 3b, via the central bore "O".

During the purifying operation, there arises a pressure difference with respect to the boundary (i.e., the filter 20). The pressure difference is produced as follows; namely: an air pressure is exerted in the air-inlet side (i.e., the dusty side) where the unpurified air is present;. The dusty-side air pressure is reduced in the air-outlet side (i.e., the clean side) where the purified air (i.e., the air having been filtered through the filter 40) is present, because there arises a suctioning negative pressure. Due to the suctioning negative pressure, the lip 46 of the gasket 4 is sucked in the direction of arrow "S2" of FIG. 2, and is pressed heavily onto the tubular inner peripheral surface 221 of the first reinforcement end plate 22 at the free end.

The lip 46 is thus brought into close contact with the inner peripheral surface 221 by the suctioning negative pressure. As a result, stable sealing is produced between the element 2 and the gasket 4 even under the following circumstances; namely:

when the gasket 4 is deteriorated, the reactive force, which results from the resilient compression in the guide 45 and the lip 46, has disappeared; and when the inner peripheral surface 221 of the first reinforcement end plate 22 has slight irregularities, or when the tubular body 40 of the gasket 4 is deformed in the replacement of the element 2, sealing has been adversely affected between the element 2 and the gasket 4.

(Performance Evaluation)

In order to verify the advantages effected by the resin-made air cleaner 1, i.e., the First Preferred Embodiment, it was subjected to a thermal durability test; under the conditions hereinafter described. For comparison, the conventional resin-made air cleaners of internal-tube-sealing construction were subjected to the same thermal durability test.

The air cleaners were thermally degraded at 120° C., and were examined for how long it took for them to exhibit dust leakage which resulted from their thermally degraded gaskets. According to the thermal durability test, it took about 10 hours for the conventional air cleaners of internal-tube-sealing construction to exhibit dust leakage at the sealing portions of their gaskets.

On the other hand, it took about 96 hours or more for the First Preferred Embodiment to exhibit dust leakage. Thus, the First Preferred Embodiment was improved sharply over the conventional air cleaners by 9.6 times or more in terms of thermal durability.

Moreover, the First Preferred Embodiment does not require the metal-made internal tube, which is a requisite component part in one of the conventional air cleaners, and which is adapted for mounting the gasket therearound. Accordingly, the weight of the First Preferred Embodiment is reduced less than that of the conventional air cleaner by about 20%. In addition, the First Preferred Embodiment has the second stopper 372 which inhibits the gasket 4 from moving radially outward.

Second Preferred Embodiment

Figure 3:
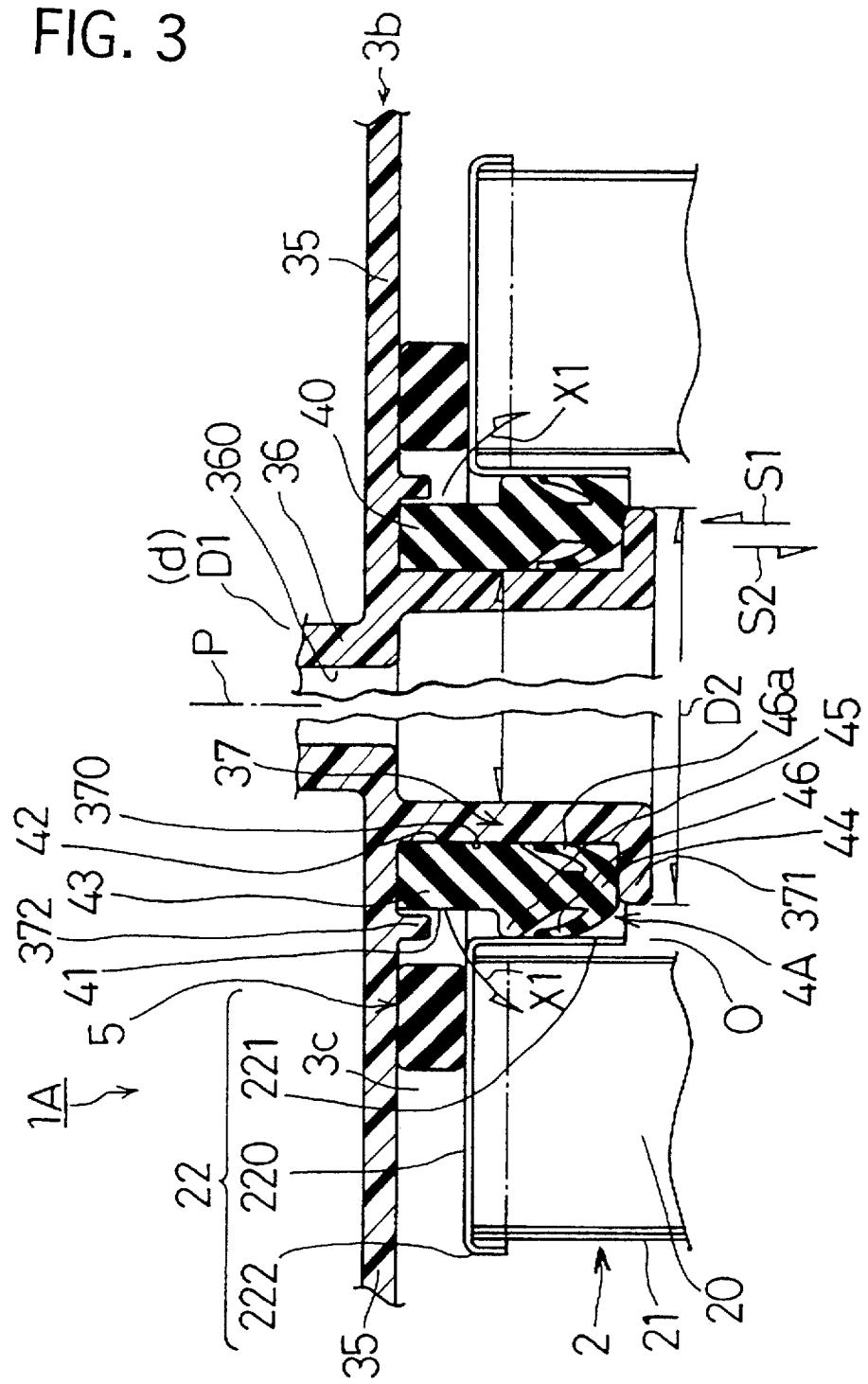
FIG. 3 is a partially enlarged cross-sectional view illustrating a Second Preferred Embodiment of a resin-made air cleaner according to the present invention whose major portions are enlarged.

A Second Preferred Embodiment of a resin-made air cleaner according to the present invention will be hereinafter described with reference to FIG. 3.

A resin-made cleaner 1A, i.e., the Second Preferred Embodiment, includes a tubular gasket 4A. As illustrated in FIG. 3, the gasket 4A has a construction, which is substantially identical with that of the gasket 4 used in the First Preferred Embodiment. However, note that the gasket 4A is provided with a second lip 46a on an inner peripheral surface 42 of its tubular body 40, but is free from the ring-shaped inner convexity 47 shown by broken line of FIG. 2. Specifically, the second lip 46a is built substantially symmetrically with the lip 46. Other than the gasket 4A, the Second Preferred Embodiment has the same construction as that of the First Preferred Embodiment.

Except that the Second Preferred Embodiment does not produce the advantage stemming from the inner convexity 47, it operates and effects the same advantages as those of the First Preferred Embodiment. In addition, in the Second Preferred Embodiment, the gasket 4A securely seals the outer peripheral surface 370 of the projection 37 with its second lip 46 when the gasket 4A is disposed on the outer peripheral surface 370, and when the element 2 is mounted onto the outer peripheral surface 370 via the gasket 4A.

Moreover, even when the gasket 4A is deteriorated, the second lip 46a is subjected to the pressure difference (i.e., the suctioning negative pressure) similarly to the lip 46. Hence, the second lip 46a is pressed onto the outer peripheral surface 370, thereby keeping the close contact and producing extra satisfactory sealing.

Third Preferred Embodiment

A Third Preferred Embodiment of a resin-made air cleaner according to the present invention will be hereinafter described with reference to FIG. 4. A rein-made cleaner 1B, i.e., the Third Preferred Embodiment, includes a tubular gasket 4B instead of the gasket 4 of the First Preferred Embodiment.

Figure 4:
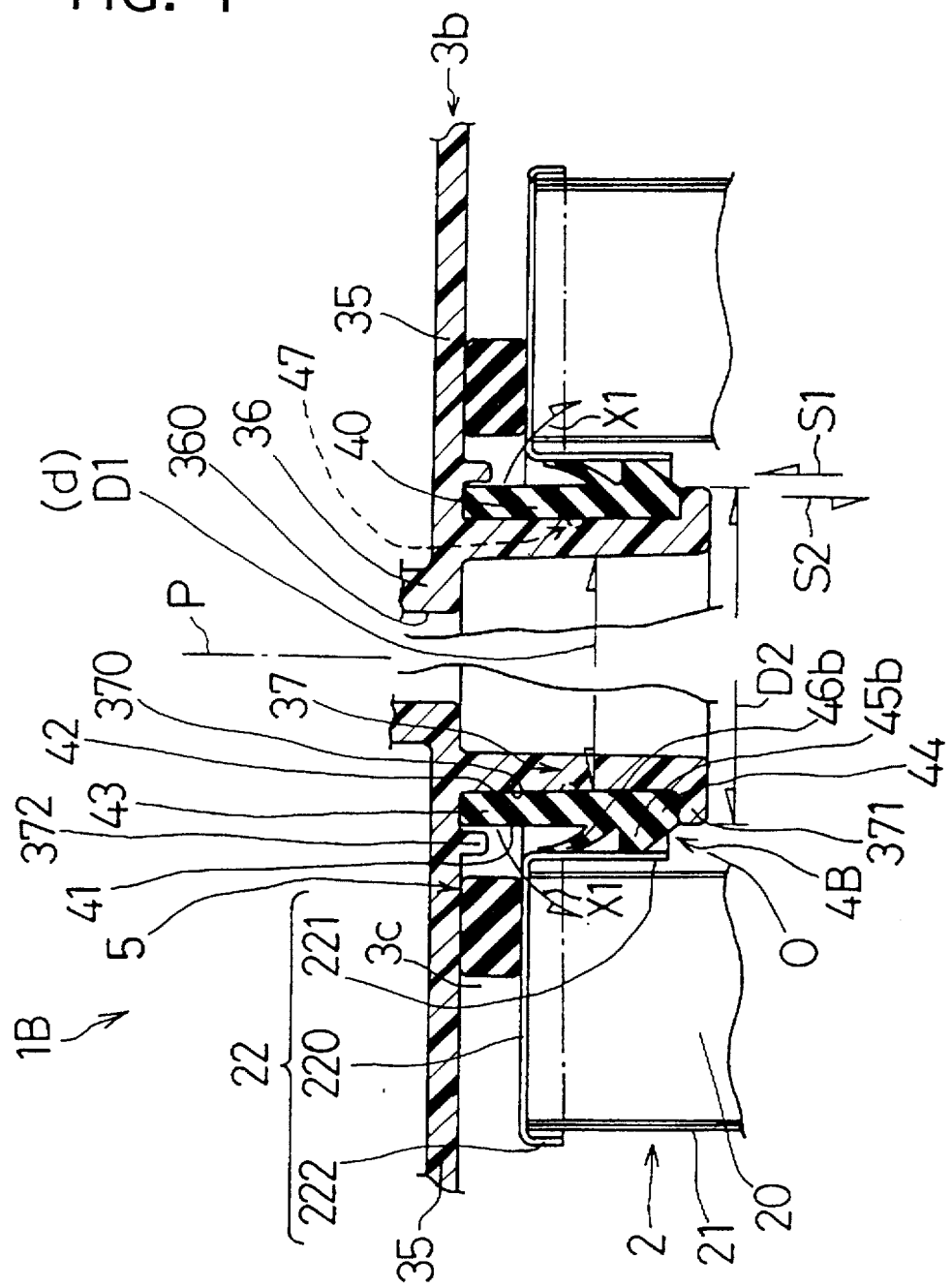
FIG. 4 is a partially enlarged cross-sectional view illustrating a Third Preferred Embodiment of a resin-made air cleaner according to the present invention whose major portions are enlarged.

As illustrated in FIG. 4, the tubular gasket 4B includes a tubular body 40, a ring-shaped lip 46b, a thick ring-shaped guide 45b, and a ring-shaped inner convexity 47. The body 40 has an outer peripheral surface 41, an inner peripheral surface 42, and opposite ends 43, 44. The lip 46b is disposed virtually at the middle between the opposite ends 43, 44 of the body 40 on the outer peripheral surface 41 thereof. Further, the lip 46b is extended from the virtual middle slantly in the direction of the assembling direction of the element 2 (e.g., in the direction of arrow "S1" of the drawing), and is formed to have a cross-section whose area diminishes from its fixed end to its free end. The guide 45b is adapted for guiding the element 2 in the assembling operation thereof. Further, the guide 45b is disposed on the outer peripheral surface 41 of the body 40 adjacent to the end 44 thereof, and is formed as a substantially triangular shape having a heavy thickness in cross-section. The inner convexity 47 is disposed on the inner peripheral surface 42 of the body 40 virtually at the middle between the opposite ends 43, 44 thereof, and is formed as a semi-circular shape in cross-section.

Except that the guide 45b and the lip 46b are disposed in the aforementioned order, which is reverse to the order in the gasket 4 of the First Preferred Embodiment, from the end 43 to the end 44, the gasket 4B has the same construction as that of the gasket 4 of the First Preferred Embodiment. Similarly to the First Preferred Embodiment, the gasket 4B is first fitted around the tubular projection 37 of the cover 3b, and thereafter the element 2 is mounted onto the projection 37 via the gasket 4B.

In the assembling operation of the element 2, the element 2 is fitted in the direction of arrow "S1" of FIG. 4 while bringing the tubular inner peripheral surface 221 of its first reinforcement end plate 22 into contact with the top of the guide 45b of the gasket 4B. Note that, during the fitting operation, the annular-shaped second gasket 5 is kept on being placed on the annular-shaped flat end surface 220 of the first reinforcement end plate 22.

Specifically, the element 2 moves in the direction of arrow "S1" of FIG. 4 while pressing the guide 45b with the tubular inner peripheral surface 221 of its first reinforcement end plate 22. Thereafter, it continues to move while contacting with the lip 46b. Finally, the element 2 arrives at its regular mounting position illustrated in FIG. 4.

When the element 2 is mounted onto the outer peripheral surface 371 of the tubular projection 37 via the gasket 4B, the Third Preferred Embodiment operates and effects advantages in the same manner as the First Preferred Embodiment.

Fourth Preferred Embodiment

A Fourth Preferred Embodiment of a resin-made air cleaner according to the present invention will be hereinafter described with reference to FIG. 5.

Figure 5:
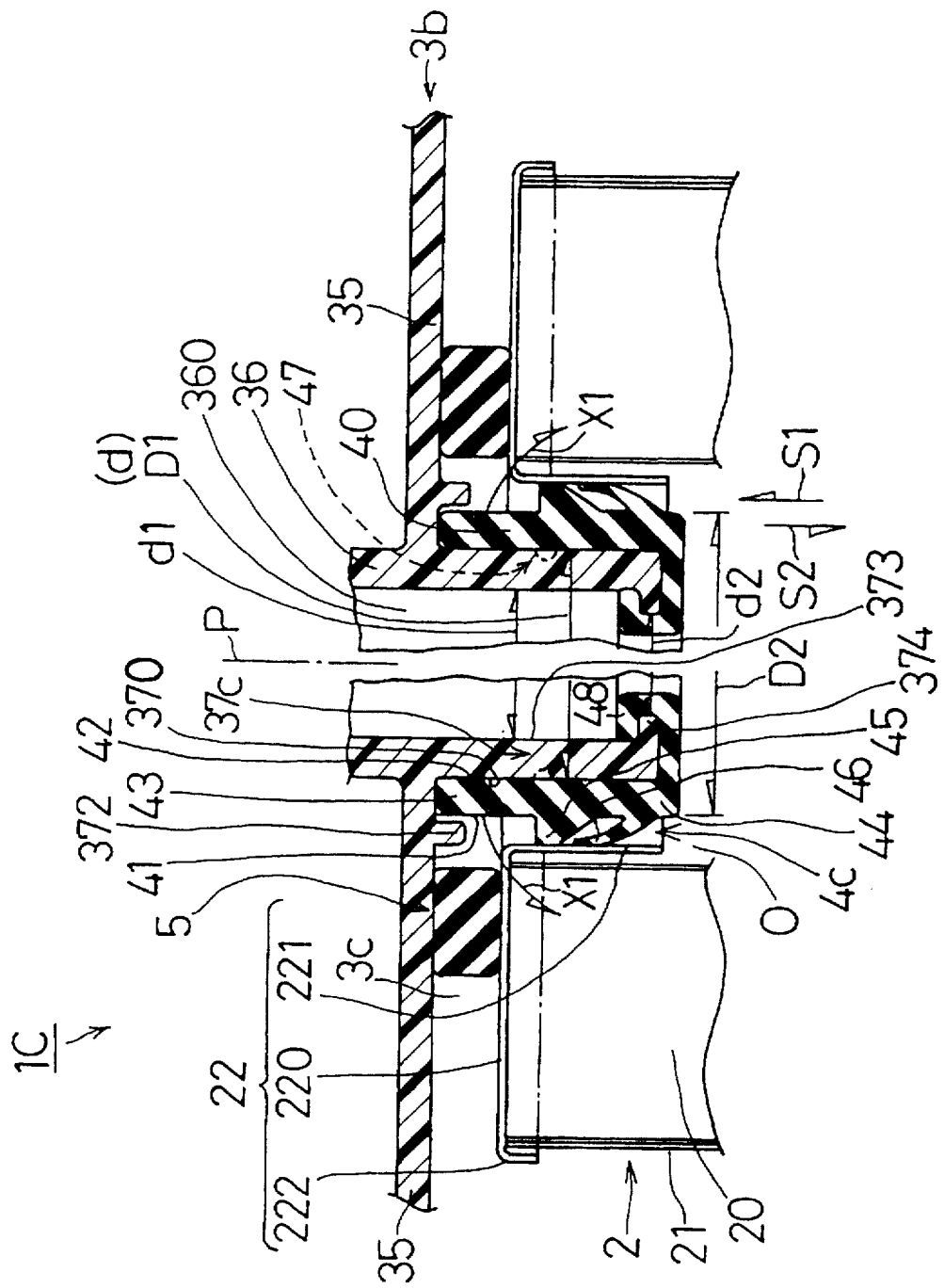
FIG. 5 is a partially enlarged cross-sectional view illustrating a Fourth Preferred Embodiment of a resin-made air cleaner according to the present invention whose major portions are enlarged.

As illustrated in FIG. 5, a resin-made air cleaner 1C. i.e., the Fourth Preferred Embodiment, includes a stopper 374, which is disposed at the free end of a tubular projection 37c on an inner peripheral surface 373 thereof, instead of the stopper 371 at the free end of the tubular projection 37 on the outer peripheral surface 370 in the First Preferred Embodiment. A tubular gasket 4C is fitted around the projection 37c, which is provided with the stopper 374.

Specifically, the stopper 374 is formed as an annular-shaped flange which projects inward in the radial direction of the tubular projection 37c, and its inside diameter "d2" is designed to be smaller than an inside diameter "d1" of the projection 37c. For example, when the inside diameter "d1" of the projection 37c is 68 mm, the inside diameter "d2" of the stopper 374 is designed to be 62 mm. Note that the inside diameters "d1" and "d2" are not limited to these values, and can be varied as desired.

Except that the tubular gasket 4C includes a ring-shaped stopper 48, which is disposed at the free end 44 on the inner peripheral surface 42, and which virtually has a letter "L"-shaped cross-section, it has the same construction as that of the gasket 4 employed in the First Preferred Embodiment. Thus, the gasket 4C engages with stopper 374 of the tubular projection 37c. Specifically, the tubular body 40 is first fitted around the free end of the projection 37c at the end 43. When the body 40 is finally mounted onto the outer peripheral surface 370 of the projection 37c, the stopper 48, which is disposed at the end 44 of the body 40 on the inner peripheral surface 42 thereof, is adapted to engage with the stopper 374.

The thus constructed Fourth Preferred Embodiment operates and effects the advantages in the same manner as the First Preferred Embodiment. Moreover, the stopper 374, which operates to inhibit the gasket 4C from coming off, projects from the inner peripheral surface 373, not from the outer peripheral surface 370, at the free end of the tubular projection 37c. Thus, when molding the cover 3b and the stopper 374 integrally with resin by using a mold, one of the mold halves, which is adapted for forming the top 35 of the cover 3b, can be removed downward with ease, because the outer peripheral surface 370 of the projection 37c is formed as a straight shape, which is parallel with the axial center line "P". Accordingly, the Fourth Preferred Embodiment is effective in the improvement of productivity.

Fifth Preferred Embodiment

Figure 6:
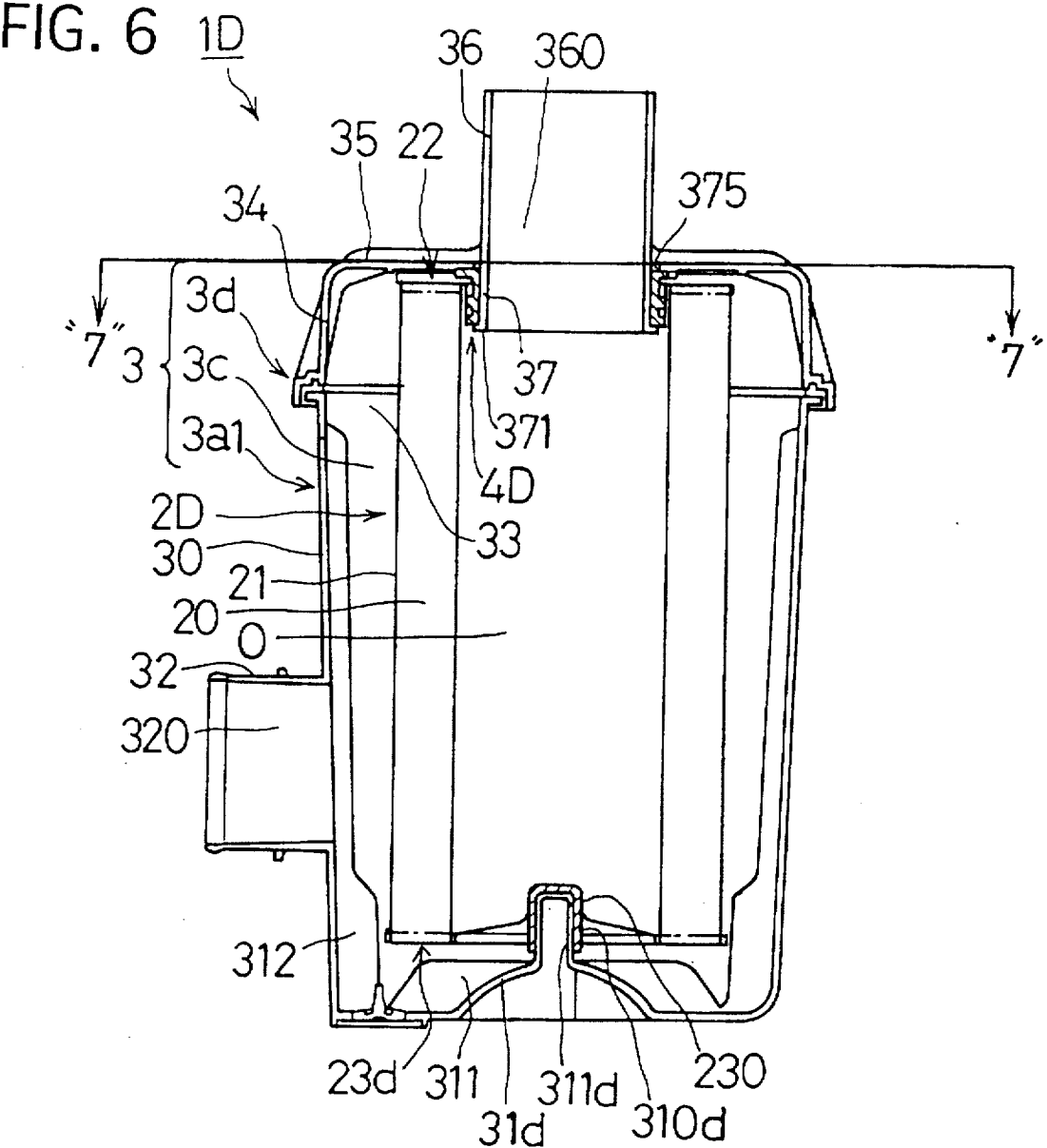
FIG. 6 is a cross-sectional view illustrating a Fifth Preferred Embodiment of a resin-made air cleaner according to the present invention.
Figure 7:
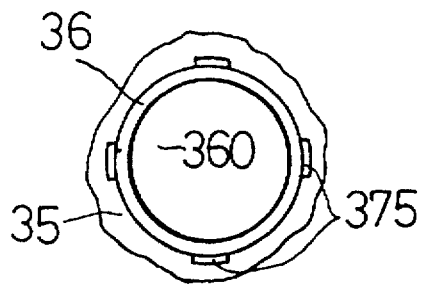
FIG. 7 is a cross-sectional view in part taken along line "7"—"7" of FIG. 6.
Figure 8:
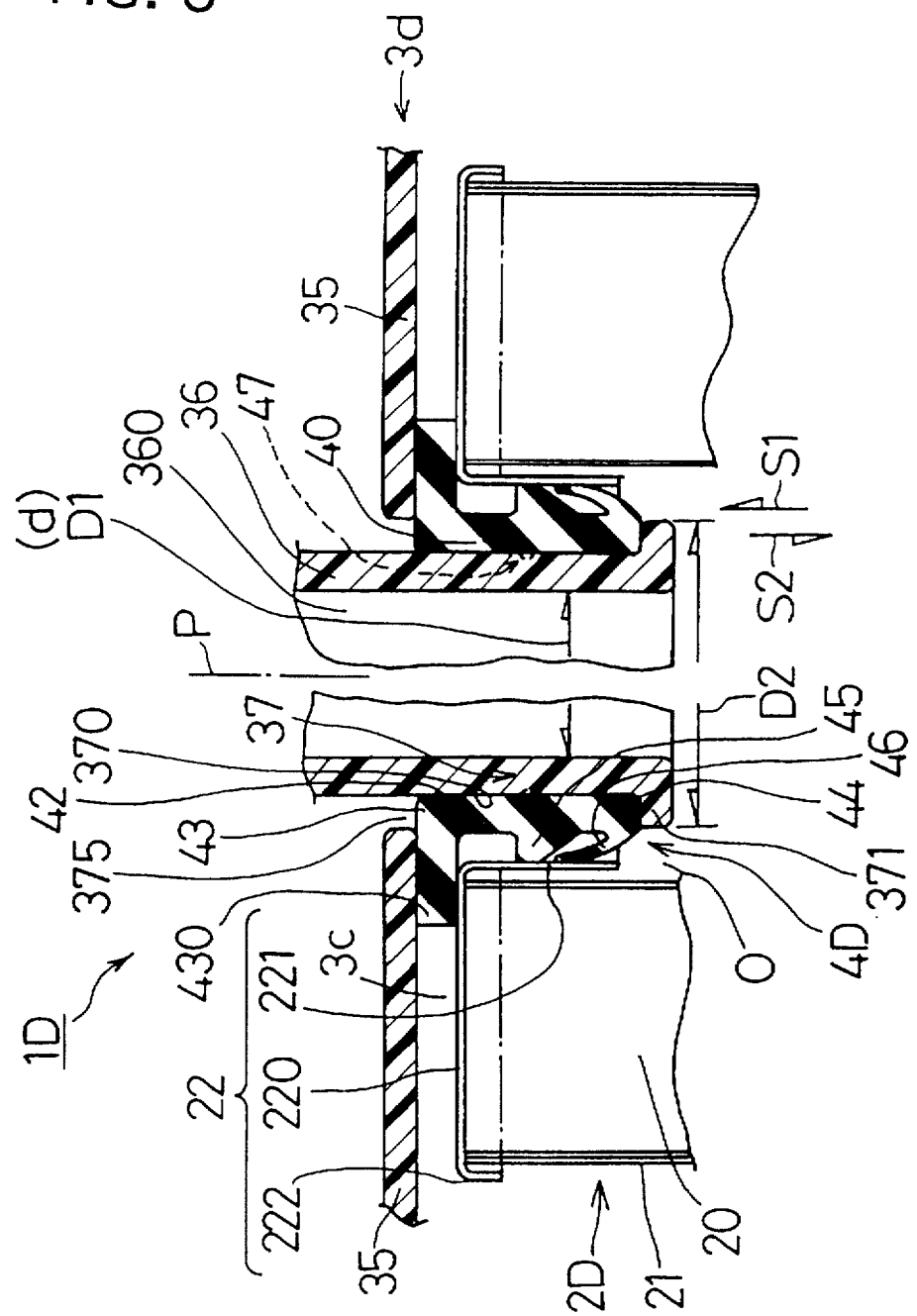
FIG. 8 is a partially enlarged cross-sectional view illustrating the Fifth Preferred Embodiment whose major portions are enlarged.

A Fifth Preferred Embodiment of a resin-made air cleaner according to the present invention will be hereinafter described with reference to FIGS. 6 through 8.

A resin-made air cleaner 1D, i.e., the Fifth Preferred Embodiment, is free from the tubular gasket 4, the second gasket 5 and the cover 3b with the second stopper 372 formed on the top 35, which are employed by the First Preferred Embodiment. Instead, as illustrated in FIGS. 6 and 8, the resin-made air cleaner ID comprises a tubular gasket 4D, and a cover 3d. As best shown in FIG. 8, the gasket 4D is provided with an annular-flanged end 430 which operates like the second gasket 5 of the First Preferred Embodiment. The cover 3d is free from the second stopper 372 of the First Preferred Embodiment, but is provided with through holes 375, which are adapted to help removing a mold for integrally molding the stopper 371 on the tubular projection 37 by using resin. In addition, as illustrated in FIG. 6, an element 2D is placed on a convexed table 311d at its second reinforcement end plate 23d via a buffer 310d. The buffer 310d has a cup-shaped cross-section. The second reinforcement end plate 23d is provided with a concaved mounting portion 230, into which the convexed table 311d is fitted. Aside from these constructions, the Fifth Preferred Embodiment has the same arrangement as that of the First Preferred Embodiment.

Other than the advantage produced by the second stopper 372, the Fifth Preferred Embodiment operates and effects the advantages in the same manner as the First Preferred Embodiment. Moreover, in the Fifth Preferred Embodiment, the through holes 375 enable to easily remove one of the mold halves, which is adapted for molding the top 35 of the cover 3d, upward after molding the tubular projection 37 and the stopper 371 integrally. The Fifth Preferred Embodiment is thus effective in the improvement of productivity. In addition, it comprises a reduced number of component parts because it obviates the second gasket 5, which is used in the First Preferred Embodiment.

Sixth Preferred Embodiment

Figure 9:
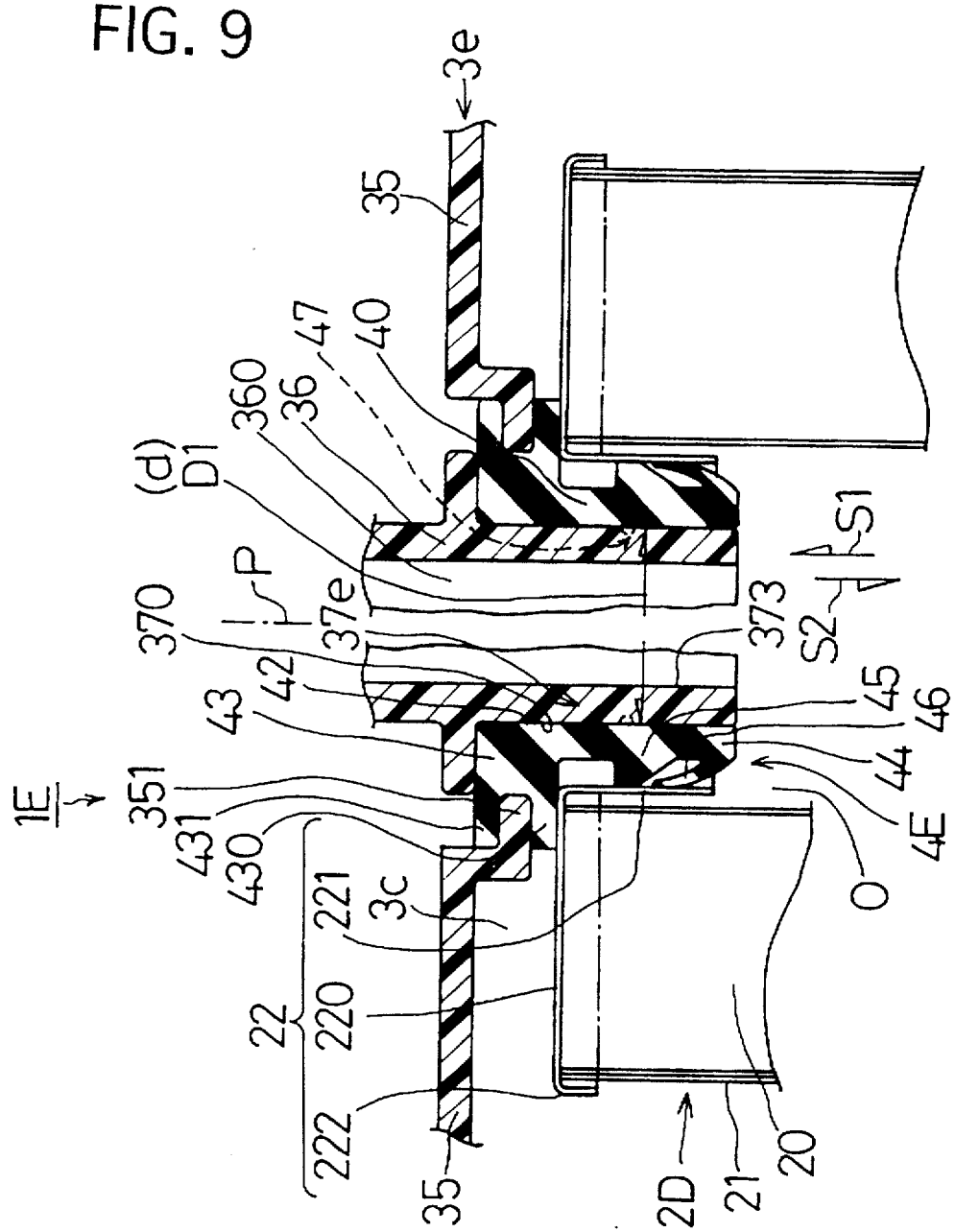
FIG. 9 is a partially enlarged cross-sectional view illustrating a Sixth Preferred Embodiment of a resin-made air cleaner according to the present invention whose major portions are enlarged.

A Sixth Preferred Embodiment of a resin-made air cleaner according to the present invention will be hereinafter described with reference to FIG. 9.

Except for the following features, a resin-made air cleaner 1E, i.e., the Sixth Preferred Embodiment, has the same arrangement as that of the Fifth Preferred Embodiment. For instance, instead of the stopper 371 (shown in FIG. 8) disposed on the tubular projection 37, it comprises a cover 3e, which is provided with a stopper 351. As illustrated in FIG. 9, the stopper 351 is formed as a part of a top 35 of the cover 3e in a letter "L"-shaped cross-section, and is projected into an accommodating chamber 3c. In addition, instead of the tubular gasket 4D, it comprises a tubular gasket 4E, which is further provided with a second annular-flanged end 431. The second annular-flanged end 431 is formed parallelly with the annular-flanged end 430, and is disposed at a predetermined distance away from the annular-flanged end 430. The predetermined distance is set so as to be slightly smaller than the thickness of the stopper 351.

In the Sixth Preferred Embodiment, the gasket 4E holds the stopper 351 between its annular-flanged end 430 and second annular-flanged end 431 when it is fitted around the tubular projection 37e. Specifically, the annular-flanged end 430 is brought into contact with the bottom surface of the stopper 351, which is formed as a part of the top 35 of the cover 3e, and the second annular-flanged end 431 is brought into contact with the top surface thereof.

The annular-flanged end 430 and the second annular-flanged end 431 of the gasket 4E thus engage with the stopper 351. As a result, even when there arises a frictional force, which acts in the gasket-coming-off direction, in the disassembling operation of the element 2D, the gasket 4E hardly comes off from the tubular projection 37e.

Moreover, in the Sixth Preferred Embodiment, the tubular projection 37e is not provided with the gasket-coming-off stopper. Thus, when molding the projection 37e integrally with the cover 3e by using a mold, one of the mold halves, which is adapted for forming the top 35 of the cover 3e, can be removed downward with ease, because the outer and inner peripheral surfaces 370, 373 of the projection 37e are formed as a straight shape, which is parallel with the axial center line "P". Accordingly, the Sixth Preferred Embodiment is effective in the improvement of productivity.

Seventh Preferred Embodiment

Figure 10:
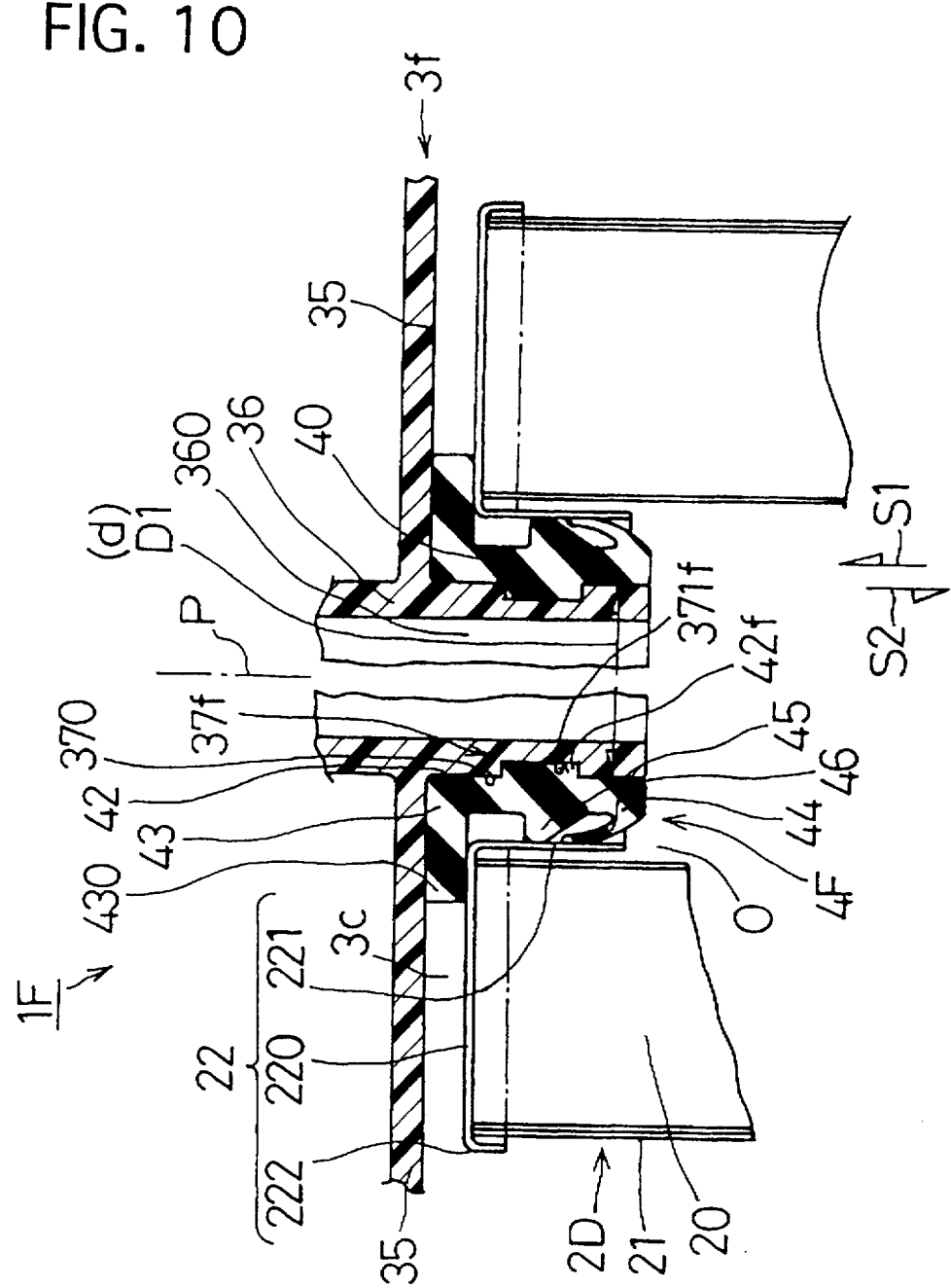
FIG. 10 is a partially enlarged cross-sectional view illustrating a Seventh Preferred Embodiment of a resin-made air cleaner according to the present invention whose major portions are enlarged.

A Seventh Preferred Embodiment of a resin-made air cleaner according to the present invention will be hereinafter described with reference to FIG. 10.

Aside from the following features, a resin-made air cleaner 1F, i.e., the Seventh Preferred Embodiment, has the same arrangement as that of the Sixth Preferred Embodiment. For example, instead of the cover 3e with the through holes 375 (shown in FIG. 9) provided in the top 35, the gasket 4E with the annular-flanged end 430 and the second annular-flanged end 431 provided, and the tubular projection 37e free from a stopper, it comprises a cover 3f, a tubular projection 37f, and a tubular gasket 4F. As illustrated in FIG. 10, the cover 3f is free from a stopper and a through hole. The projection 37f has a stopper 371f, which is formed as a circularly-concaved groove, on the outer peripheral surface 370. The gasket 4F has a circularly-convexed protrusion 42f, which is capable of engaging with the stopper 371f, on the inner peripheral surface 42 of the tubular body 40f, and is free from the ring-shaped inner convexity 47 shown by broken line in FIG. 9.

In addition to the advantages (except for the advantage resulting from the ring-shaped inner convexity 47), the Seventh Preferred Embodiment operates and effects the following extra advantages; namely: the gasket 4F is inhibited from moving in the axial direction because the stopper 371f, which is depressed in the outer peripheral surface 370 of the tubular projection 37f, is engaged with the circularly-convexed protrusion 42f, which is formed on the inner peripheral surface 42 of the gasket 4F. As a result, even when there arises a frictional force, which acts in the gasket-coming-off direction (designated by arrow "S2" of FIG. 10), in the disassembling operation of the element 2D, the gasket 4F is kept at its proper mounting position. Thus, the gasket 4F hardly moves or comes off from about the projection 37f, and thereby its sealing action scarcely deteriorates.

Moreover, in the Seventh Preferred Embodiment, the area of the outer peripheral surface 370 of the tubular projection 37f is increased because the outer peripheral surface 370 is provided with the stopper 371f, which is formed as a circularly-concaved groove. Specifically, the area of contact is enlarged between the gasket 4F and the projection 37f. Therefore, there is produced further improved sealing on the outer peripheral surface 370 of the projection 37f.

Eighth Preferred Embodiment

Figure 11:
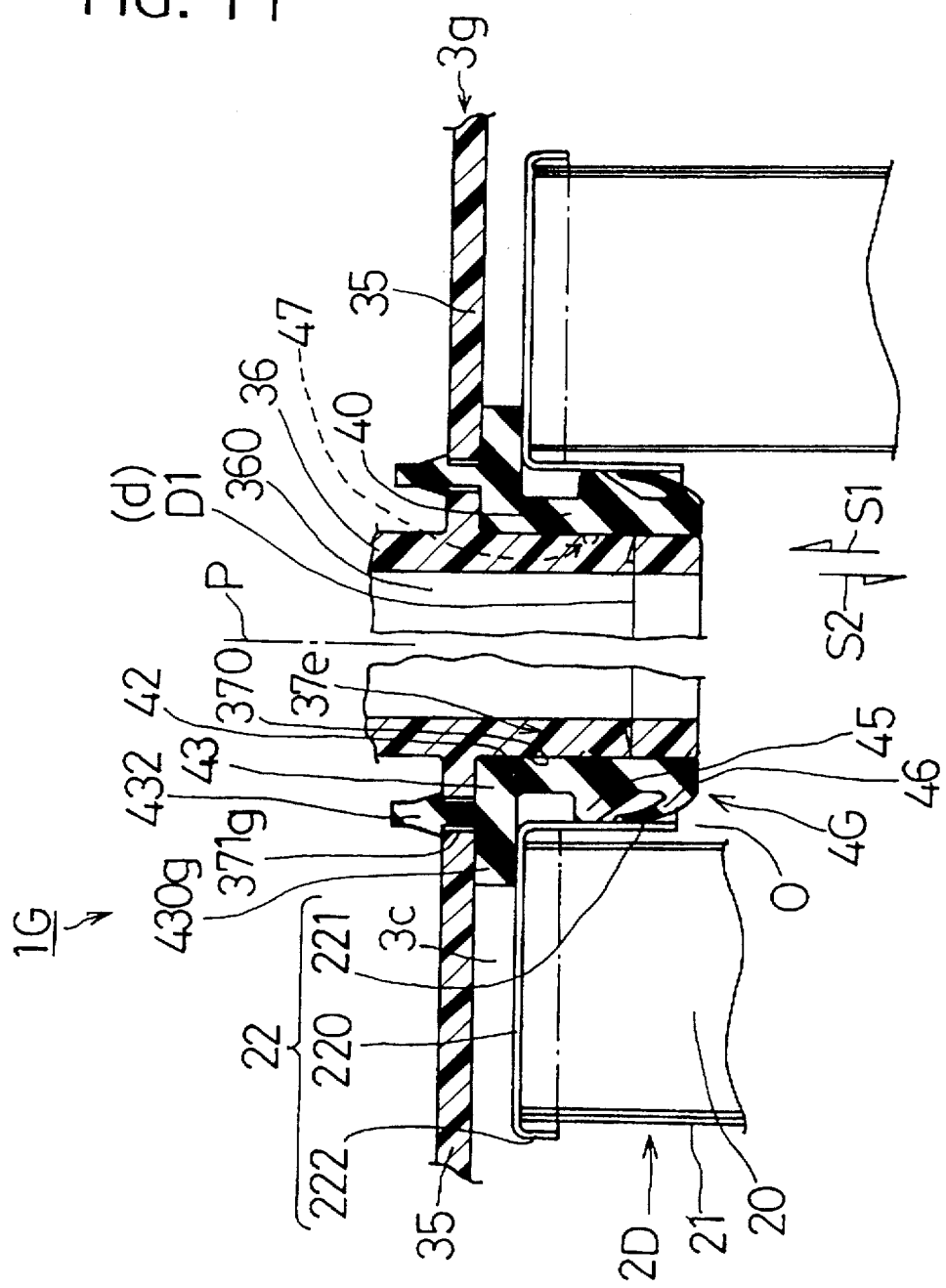
FIG. 11 is a partially enlarged cross-sectional view illustrating an Eighth Preferred Embodiment of a resin-made air cleaner according to the present invention whose major portions are enlarged.

An Eighth Preferred Embodiment of a resin-made air cleaner according to the present invention will be hereinafter described with reference to FIG. 11.

Except for the following features, a resin-made air cleaner 1G, i.e., the Eighth Preferred Embodiment, has the same arrangement as that of the Sixth Preferred Embodiment. For instance, instead of the cover 3e with the stopper 351 (shown in FIG. 9) formed as a part of the top 35, and the gasket 4E with the annular-flanged end 430 (see FIG. 9) and the second annular-flanged end 431 (see FIG. 9) provided, it comprises a cover 3g, and a tubular gasket 4G. As illustrated in FIG. 11, the cover 3g is provided with a plurality of stoppers 371g, which are formed like a circular through hole altogether in the top 35 of the cover 3g. An annular-flanged end 430g of the gasket 4G is provided with a plurality of vertical protrusions 432, which are fitted into the stoppers 371g. Note that the protrusions 432 are placed at positions on the top of the gasket 4G where they face the stoppers 371g.

The Eighth Preferred Embodiment operates and effects the advantages in the same manner as the Seventh Preferred Embodiment.

Ninth Preferred Embodiment

A Ninth Preferred Embodiment of a resin-made air cleaner according to the present invention will be hereinafter described with reference to FIGS. 12 and 13.

Except for the following features, a resin-made air cleaner 1H, i.e., the Ninth Preferred Embodiment, has the same arrangement as that of the Fifth Preferred Embodiment. For example, as illustrated in FIGS. 12 and 13, instead of the housing body 3a1 (See FIG. 6), the cover 3d with the through holes 375 (see FIGS. 7 and 8) formed in the top 35, and the tubular gasket 4D, it comprises a housing body 3a2, a cover 3h and a tubular gasket gasket 4H.

Figure 12:
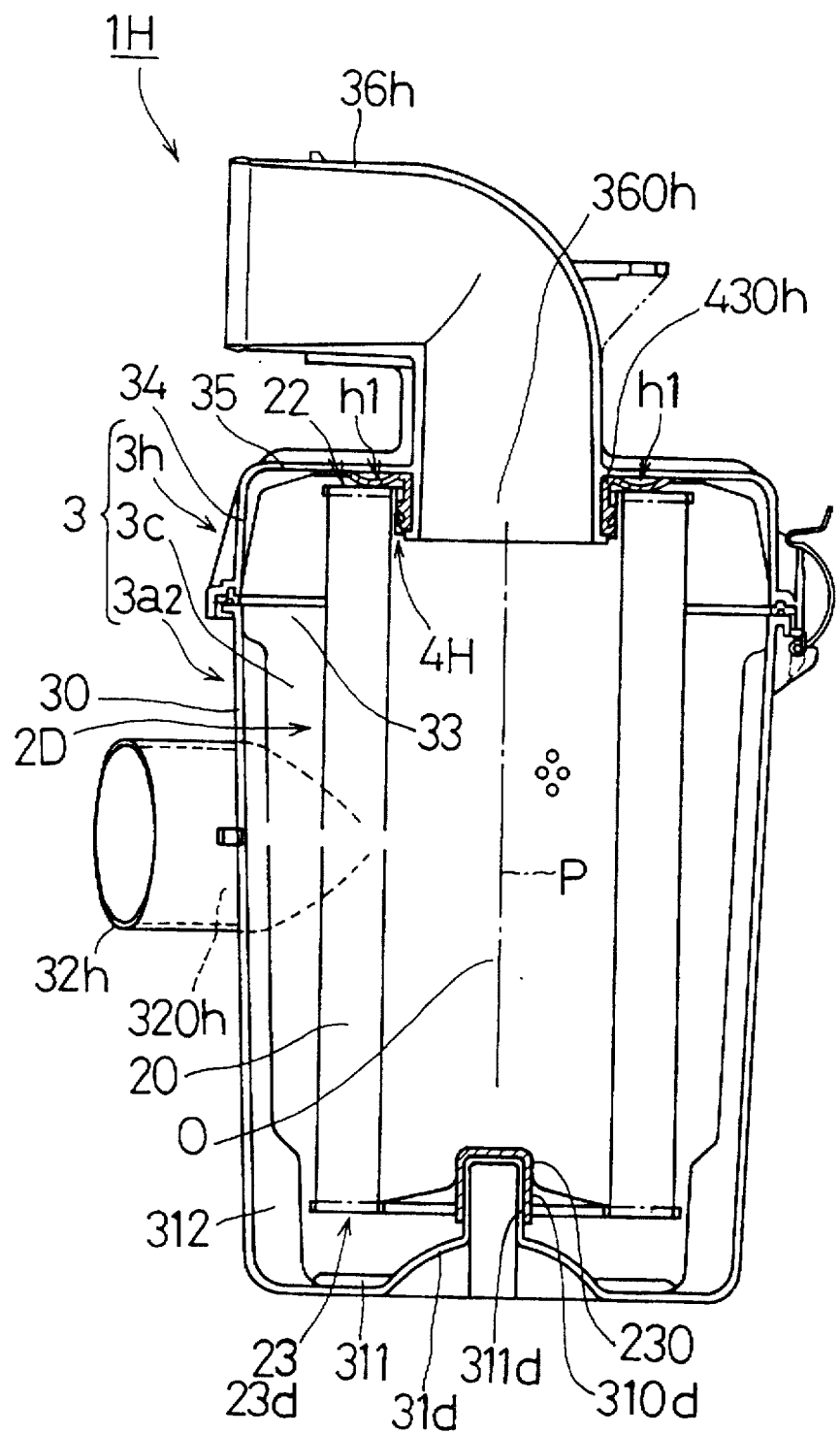
FIG. 12 is a cross-sectional view illustrating a Ninth Preferred Embodiment of a resin-made air cleaner according to the present invention.

As best shown in FIG. 12, the housing body 3a2 has a bottomed end 31d, an opened end 33, and a peripheral wall 30. The peripheral wall 30 is provided integrally with an air-inlet port 320h and an air-inlet passage 32h. The air-inlet port 320h is disposed between the bottomed end 31d and the opened end 33 on the peripheral wall 30, and is opened in the direction perpendicularly with the axial center line "P". The air-inlet passage 32h is communicated with the air-inlet port 320h.

As illustrated in FIG. 12, the cover 3h has an air-outlet passage 36h, and an air-outlet port 360. The air-outlet passage 36h is bent perpendicularly at the intermediate portion, and is communicated with the air-outlet port 360.

Figure 13:
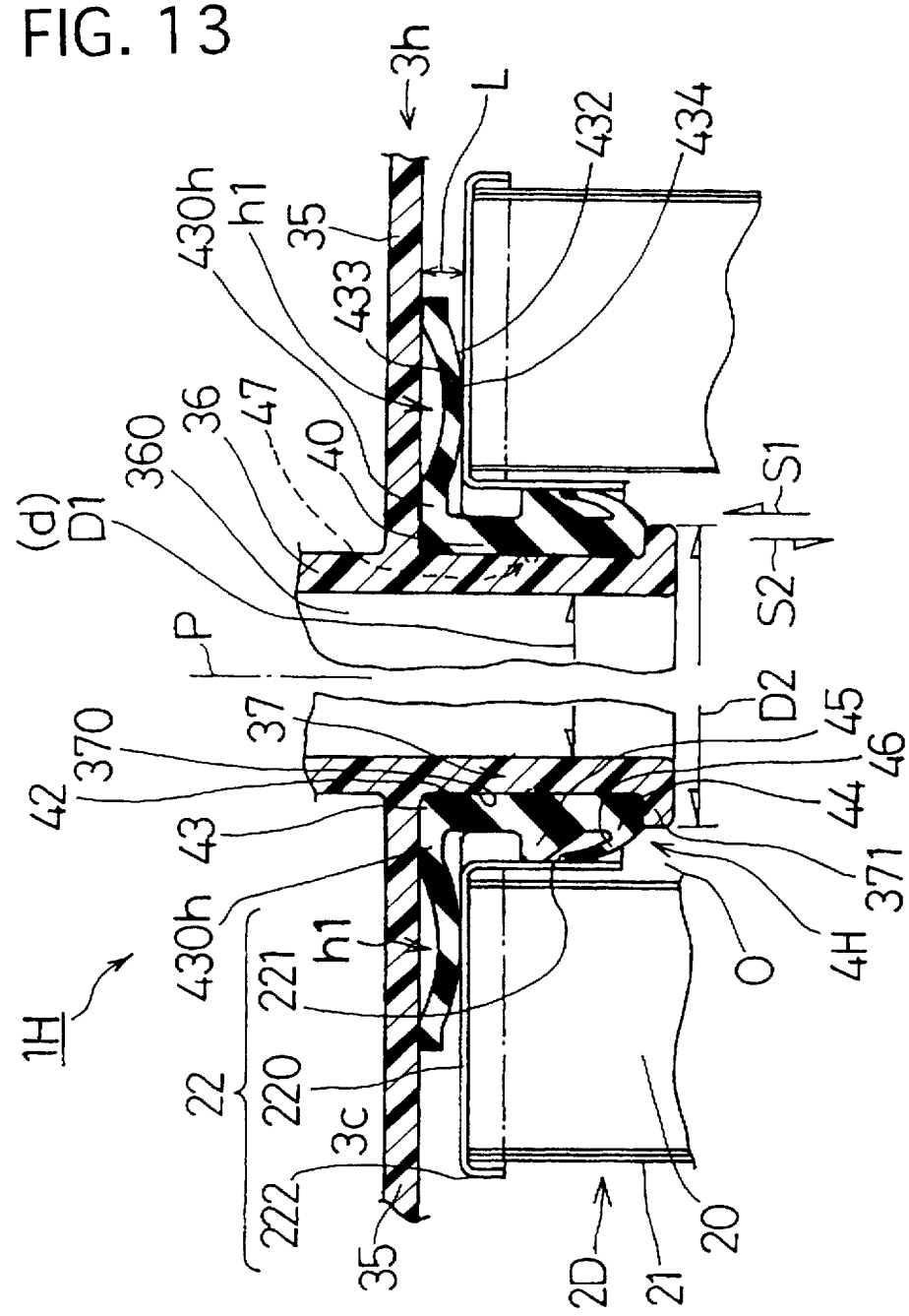
FIG. 13 is a partially enlarged cross-sectional view illustrating the Ninth Preferred Embodiment whose major portions are enlarged.

As best shown in FIG. 13, the tubular gasket 4H has an annular-flanged end 430h. The annular-flanged end 430h is provided with urging means h1. The urging means h1 is resiliently brought into contact with the first reinforcement end plate 22 of the tubular element 2D, and includes a curved portion 434. The curved portion 434 includes a convexed surface 432, and a concaved surface 433. The convexed surface 432 is formed on the outer peripheral side of the annular-flanged end 430h, which faces the first reinforcement end plate 22 of the element 2D. The concaved surface 433 is formed on the outer peripheral side of the annular-flanged end 430h, which faces the top 35 of the cover 3h. For example, the convexed surface 432 has a radius of curvature of 8 mm, and the concaved surface 433 has a radius of curvature of 5.5 mm. Note that their radii of curvature are not limited to these values, and can be varied as desired.

The element 2D is fitted around and assembled with the gasket 4H, which is mounted onto the tubular projection 37 of the cover 3h. When the element 2D is thus assembled, the gasket 4H is compressed and deformed resiliently at the urging means h1 of the annular-flanged end 430h by the first reinforcement end plate 22 of the element 2D, and by the top 35 of the cover 3h. Accordingly, the urging means h1 produces a resilient reactive force, and exerts an urging force to the first reinforcement end plate 22 and the top 35. Thus, the urging means h1 seals between itself and the first reinforcement end plate 22, and between itself and the top 35.

Specifically, the urging means h1 exerts the urging force resiliently to the element 2D, which is fitted around the tubular projection 37 via the gasket 4H, in the direction opposite to the fitting direction (e.g., in the direction of arrow "S2" of FIG. 13). Hence, even when the clearance "L" between the top 35 of the cover 3h and the top of the element 2D is fluctuated because of their tolerance variations, the urging means h1 can absorb the fluctuation of the clearance "L", and produce good sealing between the cover 3h and the element 2D. In particular, when replacing the element 2D, the urging means h1 exerts the urging force in the element-disassembling direction. As a result, the disassembling operation of the element 2D can be carried out with ease.

In addition to the advantages produced by the resin-made air cleaner 1D (i.e., the Fifth Preferred Embodiment), but except for the advantage resulting from the through holes 375, the Ninth Preferred Embodiment operates and effects the above advantages; namely: the urging means h1 produces the extra sealing, and enables to readily disassemble the element 2D.

Tenth Preferred Embodiment

A Tenth Preferred Embodiment of a resin-made air cleaner according to the present invention will be hereinafter described with reference to FIG. 14.

Aside from the following features, a resin-made air cleaner 1J, i.e., the Tenth Preferred Embodiment, has the same arrangement as that of the Ninth Preferred Embodiment. For example, instead of the tubular gasket 4H employed in the Ninth Preferred Embodiment, it comprises a tubular gasket 4J. As illustrated in FIG. 14, the gasket 4J is provided with urging means h2, which includes an inclining portion formed in an annular-flanged end 430j, in spite of the urging means h1, which includes the curved portion formed 434 in the annular flanged end 430h.

Figure 14:
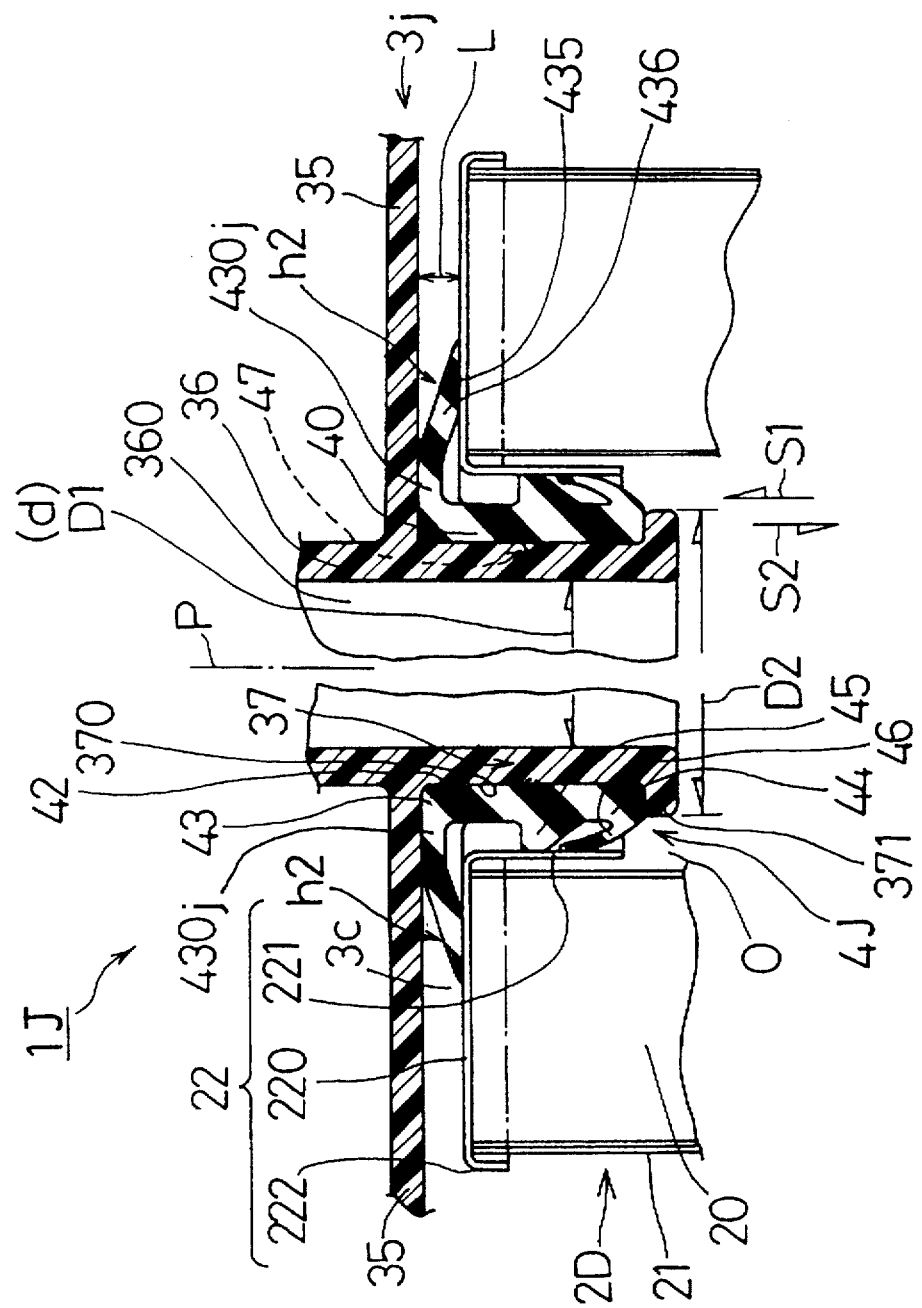
FIG. 14 is a partially enlarged cross-sectional view illustrating a Tenth Preferred Embodiment of a resin-made air cleaner according to the present invention whose major portions are enlarged.
Figure 15:
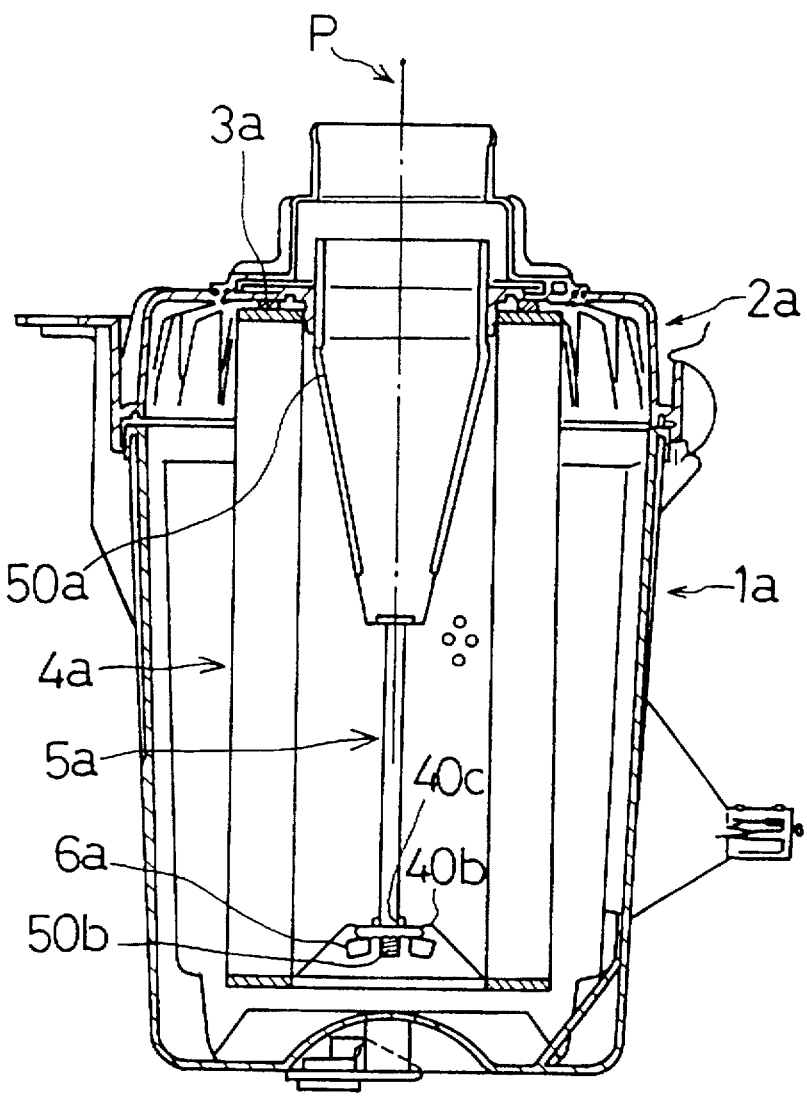
FIG. 15 is a cross-sectional view illustrating a conventional resin-made air cleaner.

As shown in FIG. 14, the tubular gasket 4J has the annular-flanged end 430j. The annular-flanged end 430j is provided with the urging means h2. The urging means h2 includes an inclining portion 436. The inclining portion 436 is disposed on the outer periphery of the annular-flanged end 430j, and is extended slantly by an angle of about 45 degrees with respect to the bottom flat surface of the annular-flanged end 430j, which faces the first reinforcement end plate 22 of the element 2D. Further, the inclining portion 436 includes a flattened contact surface 435 at the leading end. The contact surface 435 is brought into contact with the first reinforcement end plate 22 of the element 2D. Note that the slanting angle of the inclining portion 436 is not limited to the aforementioned value, and can be varied as desired.

The element 2D is fitted around and assembled with the gasket 4J, which is mounted onto the tubular projection 37 of the cover 3j. When the element 2D is thus assembled, the gasket 4J is compressed and deformed resiliently at the urging means h2 of the annular-flanged end 430j by the first reinforcement end plate 22 of the element 2D, and by the top 35 of the cover 3j. Accordingly, the urging means h2 produces a resilient reactive force, and exerts an urging force to the first reinforcement end plate 22 and the top 35. Thus, the urging means h2 seals between itself and the first reinforcement end plate 22, and between itself and the top 35.

Specifically, the urging means h2 exerts the urging force resiliently to the element 2D, which is fitted around the tubular projection 37 via the gasket 4J, in the direction opposite to the fitting direction (e.g., in the direction of arrow "S2" of FIG. 14). Hence, even when the clearance "L" between the top 35 of the cover 3j and the top of the element 2D is fluctuated because of their tolerance variations, the urging means h2 can absorb the fluctuation of the clearance "L", and produce good sealing between the cover 3j and the element 2D in the same manner as the above-described Ninth Preferred Embodiment. In particular, when replacing the element 2D, the urging means h2 exerts the urging force in the element-disassembling direction. As a result, the disassembling operation of the element 2D can be carried out with ease.

In addition to the advantages produced by the resin-made air cleaner ID, i.e., the Fifth Preferred Embodiment, but except for the advantage resulting from the through holes 375, the Tenth Preferred Embodiment operates and effects the above advantages; namely: the urging means h2 produces the extra sealing, and enables to readily disassemble the element 2D.

Having now fully described the present invention, it will be apparent to one of ordinary skill in the art that many changes and modifications can be made thereto without departing from the spirit or scope of the present invention as set forth herein including the appended claims.

What is claimed is:

1. A resin-made air cleaner, comprising:
   a hollow resin-made housing having an air-inlet port, an air-outlet port, a tubular wall surface, and opposite end surfaces;
   a tubular element having annular-shaped opposite end surfaces, the annular-shaped opposite end surfaces facing the opposite end surfaces of said housing, and being accommodated in said housing;
   a tubular projection disposed on at least one of the opposite end surfaces of said housing, said tubular projection facing the annular-shaped opposite end surfaces of said tubular element and projecting toward an inside of said housing;
   a gasket fitted around said tubular projection before an assembling operation of said tubular element, said gasket being disposed between said tubular element and said tubular projection; and
   a stopper for inhibiting said gasket from moving during a disassembling operation of said tubular element, the stopper being disposed on said tubular projection, said gasket firmly abutting against said stopper to thereby position said gasket around said tubular projection.

2. The resin-made air cleaner according to claim 1, wherein said gasket includes a tubular body having an outer peripheral surface, an inner peripheral surface and opposite end surfaces, and at least the outer peripheral surface of the tubular body is provided with a ring-shaped lip which diametrically projects over the annular-shaped opposite end surfaces of said tubular element before an assembling operation of said tubular element and slants in an outward direction.

3. The resin-made air cleaner according to claim 2, wherein the ring-shaped lip, provided on the tubular body of said gasket, has a leading free end extending to a dusty side where unpurified air is present.

4. The resin-made air cleaner according to claim 1, 2 or 3, wherein the opposite end surface, with said tubular projection provided, of said resin-made housing is further provided with a second stopper which extends coaxially with said tubular projection to the inside of the housing, and whose inside diameter is larger than an outside diameter of said tubular projection.

5. The resin-made air cleaner according to claim 2, wherein a guide is further disposed on the outer peripheral surface of the tubular body for guiding said tubular element in an assembling operation thereof, and is formed as a substantially triangular shape in cross-section.

6. The resin-made air cleaner according to claim 5, wherein the guide is disposed virtually at a center between the opposite end surfaces of the tubular body, and the lip is disposed adjacent to one of the opposite end surfaces of the tubular body.

7. The resin-made air cleaner according to claim 5, wherein the guide is disposed adjacent to one of the opposite end surfaces of the tubular body, and the lip is disposed virtually at the center between the opposite end surfaces of the tubular body.

8. The resin-made air cleaner according to claim 2, wherein a ring-shaped convexity is further disposed on the inner peripheral surface of the tubular body for producing enhanced sealing between said gasket and said tubular projection, and is formed as a semi-circular shape in cross-section.

9. The resin-made air cleaner according to claim 2, wherein a ring-shaped second lip is further disposed on the inner peripheral surface of the tubular body for producing enhanced sealing between said gasket and said tubular projection, and extends slantly with respect to the axial direction of the tubular body.

10. The resin-made air cleaner according to claim 1, wherein said stopper is disposed at a leading end of said tubular projection, and extends inward in a radial direction of said tubular projection, and said gasket includes a stopper, which is capable of engaging with said stopper.

11. The resin-made air cleaner according to claim 1, wherein said gasket includes an annular-flanged end, which is capable of contacting with the opposite end surfaces of said resin-made housing and the annular-shaped opposite end surfaces of said tubular element.

12. The resin-made air cleaner according to claim 1, wherein said stopper is disposed in one of the opposite end surfaces of said resin-made housing so as to form a through hole therein, and said gasket includes a stopper, which is capable of engaging with said stopper.

13. The resin-made air cleaner according to claim 1, wherein said tubular projection has a tubular outer peripheral surface, said stopper is formed as circularly-concaved groove in the tubular outer peripheral surface of said tubular projection, and said gasket has an inner peripheral surface, and includes a circularly-convexed protrusion, which is disposed on the inner peripheral surface, and which is capable of engaging with said stopper.

14. The resin-made air cleaner according to claim 3, wherein an annular-shaped flange is further disposed on at least one of the opposite end surfaces of the tubular body of said gasket, and projects outward in a diametric direction of the tubular body.

15. The resin-made air cleaner according to claim 14, wherein the annular-shaped flange is provided with urging means for urging said tubular element in an axial direction of the tubular body of said gasket.

16. The resin-made air cleaner according to claim 15, wherein said urging means includes a convexed surface, which is brought into contact with one of the annular-shaped opposite end surfaces of said tubular element, and a concaved surface, which is disposed so as to face one of the opposite end surfaces of said resin-made housing.

17. The resin-made air cleaner according to claim 15, wherein said urging means includes an inclining portion, which extends slantly with respect to the axial direction of the body of said gasket, and which includes a leading end being brought into contact with one of the annular-shaped opposite end surfaces of said tubular element.

* * * * *